(12) United States Patent
Rizvi et al.

(10) Patent No.: US 11,899,858 B2
(45) Date of Patent: Feb. 13, 2024

(54) INPUT DEVICE

(71) Applicant: Razer (Asia-Pacific) Pte. Ltd., Singapore (SG)

(72) Inventors: Farrukh Raza Rizvi, Singapore (SG); Ayush Sharma, Singapore (SG); Kheng Koh, Singapore (SG)

(73) Assignee: Razer (Asia-Pacific) PTE. Ltd., Singapore (SG)

( * ) Notice: Subject to any disclaimer, the term of this patent is extended or adjusted under 35 U.S.C. 154(b) by 0 days.

(21) Appl. No.: 18/044,778

(22) PCT Filed: Aug. 25, 2021

(86) PCT No.: PCT/SG2021/050502
§ 371 (c)(1),
(2) Date: Mar. 9, 2023

(87) PCT Pub. No.: WO2022/075919
PCT Pub. Date: Apr. 14, 2022

(65) Prior Publication Data
US 2023/0341956 A1   Oct. 26, 2023

(30) Foreign Application Priority Data

Oct. 8, 2020   (AU) ................................ 2020102639

(51) Int. Cl.
*G06F 3/0362*   (2013.01)
*G06F 3/01*   (2006.01)
*G06F 3/0354*   (2013.01)

(52) U.S. Cl.
CPC ............ *G06F 3/0362* (2013.01); *G06F 3/016* (2013.01); *G06F 3/03543* (2013.01)

(58) Field of Classification Search
None
See application file for complete search history.

(56) References Cited

U.S. PATENT DOCUMENTS

| 6,100,874 A | 8/2000 | Schena et al. |
| 6,717,573 B1 | 4/2004 | Shahoian et al. |

(Continued)

FOREIGN PATENT DOCUMENTS

| CN | 208938070 U | 6/2019 |
| KR | 10-1190927 B1 | 10/2012 |
| WO | 2018/132061 A1 | 7/2018 |

OTHER PUBLICATIONS

Written Opinion issued for International Application No. PCT/SG2021/050502 dated Dec. 2, 2021 (5 pages).

(Continued)

*Primary Examiner* — Ifedayo B Iluyomade
(74) *Attorney, Agent, or Firm* — Polsinelli PC

(57) ABSTRACT

An input device including a housing, a ring-shaped scroll wheel, and an integrated haptic unit inserted through the scroll wheel. The integrated haptic unit includes a bridging structure and a variable motion-resistance component coupled thereto. The variable motion-resistance component having a cylindrical body rotatable relative to the bridging structure. The scroll wheel being fixedly attached to the cylindrical body in a coaxial manner. The variable motion-resistance component being configured to vary a motion-resistance profile against a relative rotation motion between the cylindrical body and the bridging structure for defining a haptic behavior of the scroll wheel. The integrated haptic unit includes an inbuilt encoder to convert relative motion between the cylindrical body and the bridging structure as an output signal. The integrated haptic unit being mounted to the housing in a manner so as to suspend the integrated haptic unit and the scroll wheel from a portion of the housing.

17 Claims, 11 Drawing Sheets

(56) References Cited

U.S. PATENT DOCUMENTS

| | | |
|---|---|---|
| 7,106,313 B2 | 9/2006 | Schena et al. |
| 7,499,021 B2 | 3/2009 | Bailey |
| 7,564,444 B2 | 7/2009 | Rosenberg et al. |
| 2002/0030663 A1 | 3/2002 | Tierling et al. |
| 2003/0038774 A1 | 2/2003 | Piot et al. |
| 2006/0033716 A1* | 2/2006 | Rosenberg ............ G06F 3/0354 345/163 |
| 2007/0188453 A1 | 8/2007 | O'Sullivan |
| 2009/0189861 A1 | 7/2009 | Ledbetter et al. |
| 2012/0131455 A1 | 5/2012 | Han et al. |
| 2014/0145954 A1* | 5/2014 | Wu .................... G06F 3/03543 345/163 |
| 2016/0041633 A1* | 2/2016 | Weng ................. G06F 3/03543 345/163 |
| 2017/0262083 A1* | 9/2017 | Huang .................... G06F 3/016 |
| 2019/0079584 A1 | 3/2019 | Bonanno et al. |
| 2020/0004346 A1 | 1/2020 | Vlasov et al. |
| 2020/0226872 A1 | 7/2020 | Russ et al. |

OTHER PUBLICATIONS

Willings, Adrian "Razer reveals upgrades to its most popular mice," Razer Basilisk V2, Jan. 15, 2020 (7 pages).

* cited by examiner

INPUT DEVICE

CROSS REFERENCES TO RELATED APPLICATIONS

The present application claims the benefit of Australia Innovation Patent Application no. 2020102639 filed on 8 Oct. 2020, the entire contents of which are incorporated herein by reference for all purposes.

TECHNICAL FIELD

Embodiments generally relate to an input device, and particularly an input device with a scroll wheel.

BACKGROUND

Input devices for communication with a processor-based device generally include mice, track balls, joysticks, handheld controllers, touch pads, keyboards, or the like. These input devices are typically used to provide inputs to the processor-based device such that a user may interact with a graphical user interface (GUI) of an application running on the processor-based device. The input devices may include a scroll wheel for the user to scroll through lines of texts or various graphical objects in a page of the application. The conventional scroll wheel typically only allows scrolling at a single constant speed and/or a single level of resistive force. However, depending on the type of applications the user is using, for example from gaming applications to document processing applications, the input device with the single speed and/or the single level of resistive force of scroll wheel may not be sufficient to allow the user to optimize the performance of the respective applications because the desirable scroll speed for the user using the different applications may vary from application to application.

SUMMARY

According to various embodiments, there is provided an input device. The input device includes a housing, a ring-shaped scroll wheel, and an integrated haptic unit inserted through the scroll wheel. The integrated haptic unit includes a bridging structure. The integrated haptic unit includes a variable motion-resistance component coupled to the bridging structure. The variable motion-resistance component being rotatable relative to the bridging structure about a rotational axis. The scroll wheel being fixedly attached to the cylindrical body in a coaxial manner with respect to the rotational axis. The variable motion-resistance component varies a motion-resistance profile against a relative rotation motion between the variable motion-resistance component and the bridging structure based on an input control signal received by the integrated haptic unit for defining a haptic behavior of the scroll wheel. The integrated haptic unit includes an encoder built into the bridging structure to convert an angular displacement or motion between the variable motion-resistance component and the bridging structure as an output signal from the integrated haptic unit. The integrated haptic unit being mounted to the housing in a manner so as to suspend the integrated haptic unit and the scroll wheel from a portion of the housing.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 1 shows a schematic diagram of an input device, in the form of a mouse, for communication with a processor-based device according to various embodiments;

DETAILED DESCRIPTION

Figure 2A:
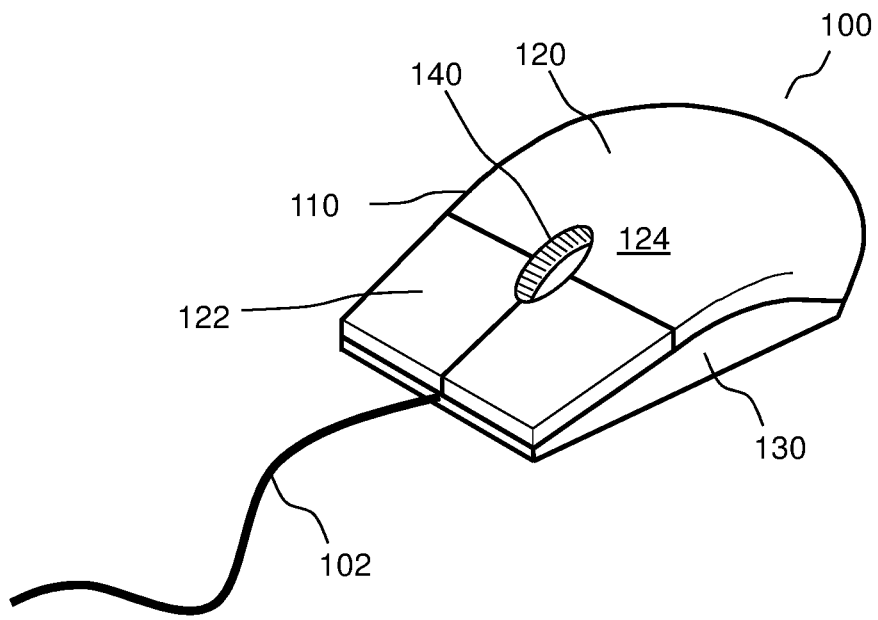
FIG. 2A shows a scroll wheel of the input device of FIG. 1 according to various embodiments.

Embodiments described below in context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments of an input device for communication with a processor-based device, such as a computer, a laptop, a notebook, or a tablet, have been provided to address at least some of the issues identified earlier.

Various embodiments of an input device for communication with a processor-based device may include a scroll wheel assembly configured to adjust or vary a haptic behavior of the scroll wheel. According to various embodiments, the scroll wheel assembly may allow the haptic behavior of the scroll wheel to be customized into various haptic patterns. For example, including, but not limited to, haptic patterns based on types/number of scroll steps per revolution, or stepped haptic pattern, or free-wheeling, or locked/restricted scrolling in one direction, or variable scrolling force based on scroll speed, or different haptic patterns between forward scroll and backward scroll, or any combination. Accordingly, the scroll wheel may switch between different modes of wheeling, for example, free-wheeling mode, resistive-wheeling mode, stepped-wheeling mode, variable force wheeling mode, etc. According to various embodiments, the haptic behavior of the scroll wheel may be based on a user input or based on a pre-defined parameters in the application running on the processor-based device. According to various embodiments, the scroll wheel assembly may adjust or vary the haptic behavior of the scroll wheel in real-time while the user is using the input device.

According to various embodiments, the scroll-wheel assembly may be customized to suit any user requirements. Accordingly, the scroll-wheel assembly may provide the user a freedom of selecting any haptic patterns from available library and/or allow the user to program haptic patterns as desired or required.

FIG. 1 shows a perspective view of an input device, in the form of a mouse 100, for communication with a processor-based device according to various embodiments. In addition of being in the form of the mouse 100 as illustrated in the various drawings, the input device according to various embodiments may also be in the form of a track ball, a joystick, a handheld controller, a touch pad, a keyboard, a computer mouse or the like, as long as the input device includes a scroll wheel.

According to various embodiments, the input device, for example in the form of the mouse 100, may include a housing 110. The housing 110 may be an exterior casing. Further, the housing 110 may include a cover portion 120 and a base portion 130. The cover portion 120 and the base portion 130 may be two separate parts of the housing 110. The cover portion 120 of the housing 110 may be a top case cover of the exterior casing of the mouse 100. The base portion 130 of the housing 110 may be a bottom case cover of the exterior casing of the mouse 100. According to various embodiments, when the cover portion 120 and the base portion 130 are assembled together, the housing 110 may define an inner cavity to house or encase internal components of the mouse 100.

According to various embodiments, the internal components of the input device, for example in the form of the mouse 100, may include an electronic circuit assembly, a motion detection assembly, as well as various mechanical assembly configured for operating input device. The electronic circuit assembly may include printed circuit boards, or any other suitable electronic circuit. The electronic circuit assembly may be connected to the processor-based device, such as a computer, via a cable 102 (or wire) or via wireless connection. The motion detection assembly may include optical sensors, or laser sensors, or track ball mechanism, or any other electronic or mechanical components that may be configured to detect movement of the input device. The motion detection assembly may further be configured to be in communication with the electronic circuit assembly such that the detected movement of the input device may be transmitted to the processor-based device, which the input device may be connected to.

Further, the cover portion 120 of the housing 110 may include one or more buttons 122. The one or more buttons 122 may be configured to interact with the electronic circuit assembly of the input device for a user to provide inputs to the processor-based device, which the input device may be connected to, via clicking of the one or more buttons. The one or more buttons 122 may include a click button, or a push button, or any combination of suitable buttons. The one or more buttons 122 may be located at any desired region of the cover portion 120 as desired.

According to various embodiments, the input device, for example in the form of the mouse 100, may include a scroll wheel 140. According to various embodiments, the scroll wheel 140 may be configured for a user to perform scrolling of a page of an application running in the processor-based device which the input device is connected to. For example, the user may use the scroll wheel 140 to scroll through lines of texts or various graphical objects in the page of the application. As shown in FIG. 1, the scroll wheel 140 may be mounted on the housing 110 in a manner so as to be rotatable and so as to be partly exposed from the housing 110 to be accessible by a user. Accordingly, the scroll wheel 140 may be rotatably mounted to the housing 110. Further, a portion of the scroll wheel 140 may be exposed through a cover surface 124 of the cover portion 120 of the housing 110. Furthermore, the scroll wheel 140 may be located between two main buttons 122 at a front portion of the cover surface 124 of the cover portion 120 of the housing 110. The scroll wheel 140 may also be at least substantially perpendicular to the cover surface 124 of the cover portion 120 of the housing 110 such that an axis of rotation of the scroll wheel 140 may be at least substantially parallel to a portion of the cover surface 124 of the cover portion 120 which the scroll wheel 140 may be mounted to. Accordingly, the user may rotate the scroll wheel 140 by stroking a finger along a circumference of the scroll wheel 140 along the cover surface 124 of the cover portion 120 of the housing 110.

According to various embodiments, the scroll wheel 140 may also be mounted to other portions or surfaces of the housing 110. For example, the scroll wheel 140 may be mounted to a side portion or a side surface of the housing 110.

According to various embodiments, the housing 110 of the input device in the form of the mouse 100 may include a base surface at the base portion 130 of the housing 110. The base surface may be configured to face a tracking surface on which the mouse 100 may be placed on. Accordingly, the base surface of the housing 110 may be an exterior surface of a substantially flat section of the base portion 130 of the housing 110. Thus, the mouse 100 may be placed with the base surface of the base portion 130 of the housing 110 substantially flat against or substantially parallel to a mouse pad, a table top, or any other suitable tracking surfaces on which the mouse may be used.

Further, the base portion 130 of the housing 110 of the input device in the form of the mouse 100 may include a window. The window may be an opening or a transparent portion of the base portion 130. Accordingly, the window may allow the motion detection assembly of the mouse 100 to detect relative movement between the mouse 100 and the tracking surface on which the mouse 100 may be placed and moved.

According to various embodiments, the input device in the form of the mouse 100 may include one or more (e.g., a plurality of) mouse feet protruding from the base surface of the base portion 130 of the housing 110. The one or more mouse feet may be configured for directly contacting the tracking surface on which the mouse 100 may be placed and moved, and the one or more mouse feet may be configured to facilitate gliding or sliding of the mouse 100 over the tracking surface. According to various embodiments, the one or more mouse feet may be made of polytetrafluoroethylene.

According to various embodiments, the one or more mouse feet may be attached to the base surface of the housing 110 via adhesive or any other suitable fastening means. According to various other embodiments, the one or more mouse feet may be integrally molded with the base portion 130 and forming a portion of the base portion 130 of the housing 110.

Figure 2B:
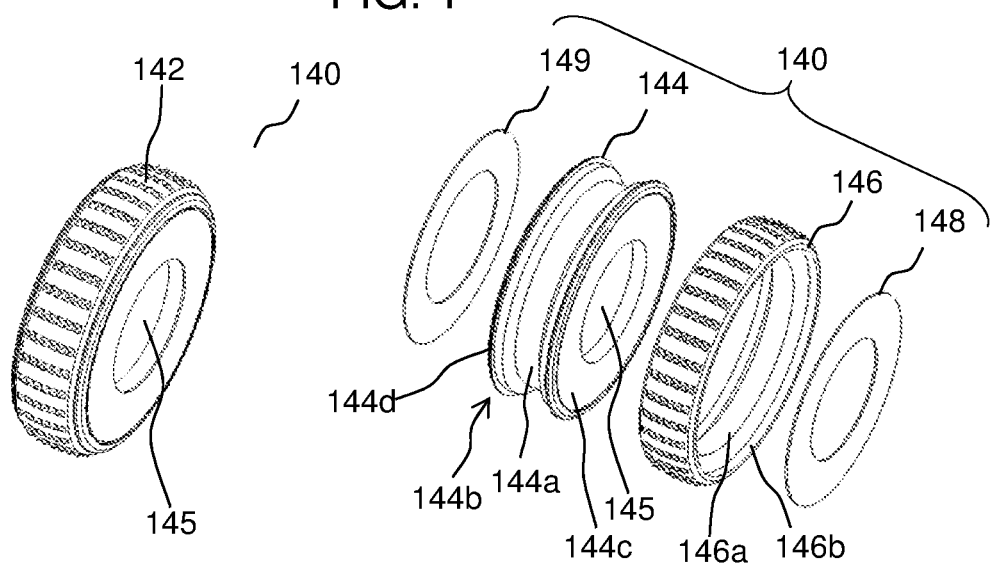
FIG. 2B shows an exploded view of the scroll wheel of FIG. 2A according to various embodiments.

FIG. 2A shows the scroll wheel 140 of the input device, for example in the form of the mouse 100, according to various embodiments. FIG. 2B shows an exploded view of the scroll wheel 140 of FIG. 2A according to various embodiments. According to various embodiments, the scroll wheel 140 may be in the shape of a ring. In other words, the scroll wheel 140 may be of a ring-shaped structure having a circular band with a through-hole in a center of the ring-shaped structure. According to various embodiments, the scroll wheel 140 may include an outer cylindrical surface 142. The outer cylindrical surface 142 of the scroll wheel 140 may be textured for gripping so as to facilitate rotating of the scroll wheel 140 by the user.

Referring to FIG. 2B, according to various embodiments, the scroll wheel 140 may include an inner rim 144, an outer ring 146, a first annular plate 148 and a second annular plate 149. According to various embodiments, the inner rim 144 may be the shape of a ring having a through-hole 145 in the center of the inner rim 144. According to various embodiments, the inner rim 144 may include a continuous endless groove 144a along an outer circumferential side 144b of the inner rim 144. According to various embodiments, the outer ring 146 may be fitted to the inner rim 144 in a manner such that the outer ring 146 is surrounding the outer circumferential side 144b of the inner rim 144. According to various embodiments, outer ring 146 may include a continuous endless tongue 146a along an inner circumferential surface 146b of the outer ring 146. According to various embodiments, the continuous endless tongue 146a of the outer ring 146 may be fitted into the continuous endless groove 144a of the inner rim 144 when the outer ring 146 is fitted to the inner rim 144. According to various embodiments, the first annular plate 148 may be attached to a first planar side 144c of the rim 144 and the second annular plate 149 may be attached to a second planar side 144d of the rim 144.

Figure 3A:
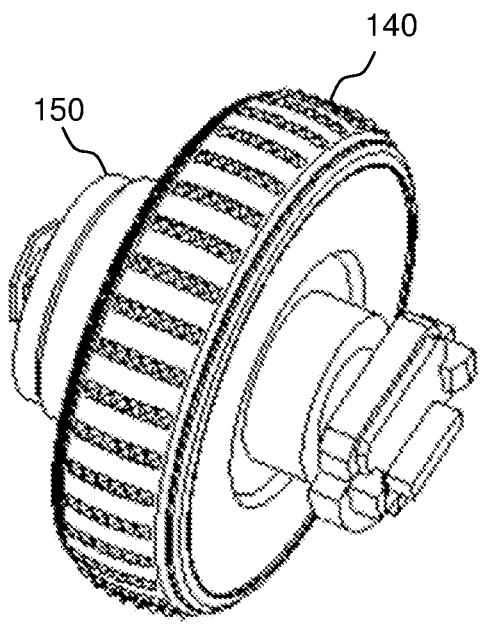
FIG. 3A shows the scroll wheel of FIG. 2A fitted to an integrated haptic unit according to various embodiments.
Figure 3B:
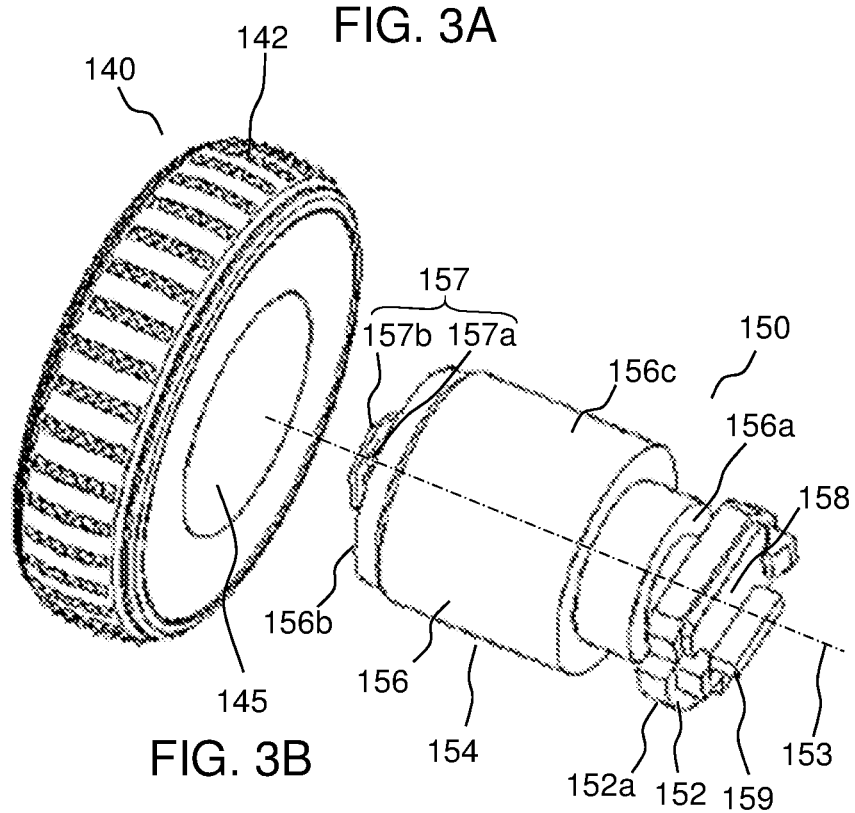
FIG. 3B shows a disassembled view of FIG. 3A according to various embodiments.

According to various embodiments, the input device, for example in the form of the mouse 100, may include an integrated haptic unit 150. FIG. 3A shows the scroll wheel 140 fitted to the integrated haptic unit 150 according to various embodiments. FIG. 3B shows a disassembled view of the scroll wheel 140 and the integrated haptic unit 150 according to various embodiments. According to various embodiments, the integrated haptic unit 150 may be inserted through the scroll wheel 140. Accordingly, the integrated haptic unit 150 may be inserted through the through-hole 145 of the scroll wheel 140. According to various embodiments, the integrated haptic unit 150 may be configured to adjust or vary a haptic behavior of the scroll wheel 140. According to various embodiments, the integrated haptic unit 150 may be configured to allow the haptic behavior of the scroll wheel 140 to be customized into various haptic patterns. For example, including, but not limited to, haptic patterns based on types/number of scroll steps per revolution, or stepped haptic pattern, or free-wheeling, or locked/restricted scrolling in one direction, or variable scrolling force based on scroll speed, or different haptic patterns between forward scroll and backward scroll, or any combination. Accordingly, the scroll wheel 140 may switch between different modes of wheeling, for example, free-wheeling mode, resistive-wheeling mode, stepped-wheeling mode, variable force wheeling mode, etc.

According to various embodiments the integrated haptic unit 150 may include a bridging structure 152. The bridging structure 152 may serve as a support or brace or bracket or arrangement for holding or keeping various components of the integrated haptic unit 150 together. According to various embodiments, the bridging structure 152 may be of any suitable shape or may be customized with various shapes, or features, or recesses, or protrusions for holding or receiving the various components of the integrated haptic unit 150. According to various embodiments, the bridging structure 152 may also be configured to be mounted or coupled to the housing 110 of the input device for mounting the integrated haptic unit 150 to the housing 110.

According to various embodiments, the integrated haptic unit 150 may include a variable motion-resistance component 154 coupled to the bridging structure 152. Accordingly, the variable motion-resistance component 154 may be held or received by the bridging structure 152. According to various embodiments, the variable motion-resistance component 154 may include a cylindrical body 156. According to various embodiments, the variable motion-resistance component 154 may by coupled to the bridging structure 152 in a manner such that a first end 156a of the cylindrical body 156 may be directed towards the bridging structure 152. According to various embodiments, the cylindrical body 156 may be rotatable relative to the bridging structure 152 about a longitudinal axis 153 of the cylindrical body 156. Accordingly, the longitudinal axis 153 of the cylindrical body 156 of the variable motion-resistance component 154 may be the rotational axis of the cylindrical body 156. According to various embodiments, the variable motion-resistance component 154 may include a shaft. An end of the shaft may be fixedly attached to the bridging structure 152. The cylindrical body 156 may be fitted over the shaft in a coaxial manner so as to surround or encircle the shaft such that the first end 156a of the cylindrical body 156 may be directed towards the bridging structure 152 and a second end 156b of the cylindrical body 156 may be directed away from the bridging structure 152. Accordingly, the cylindrical body 156 may be rotatable around the shaft such that the cylindrical body 156 may be revolved about the shaft. Accordingly, the shaft may be extending inside the cylindrical body 156 and along the longitudinal axis 153 of the cylindrical body 156.

According to various embodiments, the scroll wheel 140 may be fixedly attached to the cylindrical body 156 of the variable motion-resistance component 154 of the integrated haptic unit 150. Accordingly, the scroll wheel 140 may be fastened securely or firmly attached to the cylindrical body 156 such that the scroll wheel 140 and the cylindrical body 156 of the variable motion-resistance component 154 of the integrated haptic unit 150 may rotate together integrally as a single unit about the longitudinal axis 153 of the cylindrical body 156. According to various embodiments, the scroll wheel 140 may be attached to the cylindrical body 156 of the variable motion-resistance component 154 of the integrated haptic unit 150 in a coaxial manner. Accordingly, an axis of the scroll wheel 140 may coincide with the longitudinal axis 153 of the cylindrical body 156 of the variable motion-resistance component 154 of the integrated haptic unit 150 such that the scroll wheel 140 is rotatable about the same rotational axis as the cylindrical body 156 of the variable motion-resistance component 154 of the integrated haptic unit 150 together. According to various embodiments, the scroll wheel 140 may be fixedly attached to the cylindrical body 156 of the variable motion-resistance component 154 via various fastening technique including, but not limited to, interference fitting, snap-fitting, adhesive, threaded fastening, clamping, latching, riveting, nailing, clipping, pinning, etc.

According to various embodiments, the integrated haptic unit 150 may be mounted to the housing 110 of the input device, for example in the form of the mouse 100, in a manner so as to suspend the integrated haptic unit 150 and the scroll wheel 140 from a portion of the housing 110. According to various embodiments, the integrated haptic unit 150 and the scroll wheel 140 may be suspended above the base portion 130 of the housing 110 such that part of the scroll wheel 140 may be exposed through the cover surface 124 of the cover portion 120 of the housing 110. According to various embodiments, since the cylindrical body 156 of the variable motion-resistance component 154 of the integrated haptic unit 150 is rotatable relative to the bridging structure 152 of the integrated haptic unit 150, the bridging structure 152 of the integrated haptic unit 150 may be mounted to the housing 110 in a non-rotatable manner while the scroll wheel 140 attached to the cylindrical body 156 of the variable motion-resistance component 154 of the integrated haptic unit 150 may still be rotatable with respect to the housing 110.

According to various embodiments, the variable motion-resistance component 154 may support the cylindrical body 156 of the variable motion-resistance component 154 with respect to the bridging structure 152 in a manner such that the cylindrical body 156 may be rotatable relative to the bridging structure 152. Accordingly, the variable motion-resistance component 154 may support the cylindrical body 156 of the variable motion-resistance component 154 in a manner resembling a conventional bearing, such as rolling-element bearing, fluid bearing, or magnetic bearing, so as to achieve the effect of the cylindrical body 156 of the variable motion-resistance component 154 being rotatable relative to the bridging structure 152. Accordingly, the bridging structure 152 may be coupled to an interior part (e.g. the shaft) of the variable motion-resistance component 154 and the cylindrical body 156 as an exterior part of the variable motion-resistance component 154 may be rotatable relative to the bridging structure 152. However, the variable motion-resistance component 154 differs from the conventional bearing in that the variable motion-resistance component 154 according to various embodiments may vary a motion-resistance profile against a relative rotation motion between the cylindrical body 156 and the bridging structure 152 based on an input control signal received by the integrated haptic unit 150 for defining a haptic behavior of the scroll wheel 140. For example, the variable motion-resistance component 154 may exhibit or execute the motion-resistance profile based on types/number of scroll steps per revolution, or stepped haptic pattern, or free-wheeling, or locked/restricted scrolling in one direction, or variable scrolling force based on scroll speed, or different haptic patterns between forward scroll and backward scroll, or any combination thereof.

According to various embodiments, the input control signal received by the integrated haptic unit 150 may be based on a software application installed in the processor-based device, for example, including, but not limited to, a computer or a laptop or a notebook or a tablet, which is connected to the input device. According to various embodiments, based on a user input or a parameter set in an application running on the processor-based device, a signal may be sent from the processor-based device to the electronic circuit assembly of the input device. The electronic circuit assembly of the input device may include a controller which may process the signal from the processor-based device to send the input control signal to the integrated haptic unit 150 for controlling the motion-resistance profile to be executed or exhibited or displayed by the variable motion-resistance component 154 of the integrated haptic unit 150.

According to various embodiments, the variable motion-resistance component 154 may include any one or a combination of magnetic elements arrangement, electro-magnetic elements arrangement, electrorheological fluid arrangement, or magnetorheological fluid arrangement. Accordingly, by varying an electric field or a magnetic field or both across the variable motion-resistance component 154, the variable motion-resistance component 154 of the integrated haptic unit 150 may be controlled to vary the motion-resistance profile against a relative rotation motion between the cylindrical body 156 and the bridging structure 152. According to various embodiments, the integrated haptic unit 150 may include an electric and/or magnetic field generator to generate the electric field and/or the magnetic field across the variable motion-resistance component 154 for influencing the variable motion-resistance component 154 to vary the behavior of the variable motion-resistance component 154 so as to vary the motion-resistance profile against a relative rotation motion between the cylindrical body 156 and the bridging structure 154 for defining the haptic behavior of the scroll wheel 140.

For example, according to various embodiments, when the variable motion-resistance component 154 of the hub-haptic unit 150 includes the magnetorheological fluid arrangement, the hub-haptic unit 150 may be a magnetorheological hub-haptic unit 150. According to various embodiments, the magnetorheological fluid arrangement may include a magnetorheological fluid disposed inside the variable motion-resistance component 154. According to various embodiments, variable motion-resistance component 154 of the hub-haptic unit 150 may be controlled to vary a magnetic field applied across the magnetorheological fluid inside the variable motion-resistance component 154 to vary a flow behavior of the magnetorheological fluid so as to vary the motion-resistance profile against the relative rotation motion between the cylindrical body 156 of the variable motion-resistance component 154 and the bridging structure 152 for defining the haptic behavior of the scroll wheel 140.

As another example, according to various embodiments, the variable motion-resistance arrangement 156 of the integrated haptic unit 150 may include a combination of the magnetorheological fluid arrangement and the magnetic elements arrangement and/or the electro-magnetic elements arrangement. According to various embodiments, the magnetic elements arrangement and/or the electro-magnetic elements arrangement may serve as the magnetic field generator for varying the magnetic field applied across the magnetorheological fluid inside the variable motion-resistance component 154 to vary the flow behavior of the magnetorheological fluid.

As a further example, according to various embodiments, the variable motion-resistance component 154 of the integrated haptic unit 150 may include a combination of the magnetic elements arrangement and the electro-magnetic elements arrangement. According to various embodiments, the electro-magnetic elements arrangement may vary the magnetic field applied across the variable motion-resistance component 154 so as to vary the magnetic interaction between the magnetic elements arrangement and the electro-magnetic elements arrangement so as to vary the motion-resistance profile against the relative rotation motion between the cylindrical body 156 of the variable motion-resistance component 154 and the bridging structure 152 for defining the haptic behavior of the scroll wheel 140.

As yet another example, according to various embodiments, when the variable motion-resistance component 154 of the integrated haptic unit 150 includes the electrorheological fluid arrangement, the integrated haptic unit 150 may be an electrorheological integrated haptic unit 150. According to various embodiments, the electrorheological fluid arrangement may include an electrorheological fluid 155b disposed inside the variable motion-resistance component 154. According to various embodiments, the variable motion-resistance component 154 may be controlled to vary an electric field applied across the electrorheological fluid in the variable motion-resistance component 154 to vary a flow behavior of the electrorheological fluid so as to vary the motion-resistance profile against the relative rotation motion between the cylindrical body 156 of the variable motion-resistance component 154 and the bridging structure 152 for defining the haptic behavior of the scroll wheel 140.

According to various embodiments, the integrated haptic unit 150 may include an encoder 158. According to various embodiments, the encoder 158 may be built into the bridging structure 152. Accordingly, a detector/sensor, an electronic board, and/or an emitter of the encoder 158 may be built-in so as to be an integral or permanent part with the bridging structure 152. Hence, the bridging structure 152 may hold or receive the various parts of the encoder 158 as an integrated assembly. According to various embodiments, the encoder 158 may convert an angular displacement or motion between the cylindrical body 156 of the variable motion-resistance component 154 and the bridging structure 152 as an output signal from the integrated haptic unit 150. According to various embodiments, the encoder 158 may sense or measure or detect the relative rotation motion between the cylindrical body 156 of the variable motion-resistance component 154 and the bridging structure 152 for generating the output signal to be transmitted from the integrated haptic unit 150.

According to various embodiments, one or more connection ports 159 may be built into the bridging structure 152. Accordingly, the one or more connection ports may be built-in so as to be an integral or permanent part with the bridging structure 152. Hence, the bridging structure 152 may hold or receive the various parts of the one or more connection ports as an integrated assembly. According to various embodiments, the one or more connection ports may be electrically connected to the variable motion-resistance component 154 and/or the encoder 158. According to various embodiments, the one or more connection ports 159 may be connected to the electronic circuit assembly of the input device such that the controller of the electronic circuit assembly of the input device may send the input control signal to the integrated haptic unit 150 for controlling the motion-resistance profile of the variable motion-resistance component 154. Further, the one or more connection ports 159 may be connected to the electronic circuit assembly of the input device such that the integrated haptic unit 150 may send the output signal from the encoder 158 representing the angular displacement or motion between the cylindrical body 156 of the variable motion-resistance component 154 and the bridging structure 152 to the electronic circuit assembly of the input device.

According to various embodiments, the integrated haptic unit 150 may be mounted to the housing 110 with the second end 156b of the cylindrical body 156 of the variable motion-resistance component 154 and the bridging structure 152 being respectively supported in a manner so as to suspend the scroll wheel 140 from the portion of the housing 110. Since the first end 156a of the cylindrical body 156 of the variable motion-resistance component 154 is directed towards the bridging structure 152, the bridging structure 152 maybe opposite to the second end 156b of the cylindrical body 156 of the variable motion-resistance component 154 along the longitudinal axis 153 with respect to the cylindrical body 156. Accordingly, since the scroll wheel 140 is attached to the cylindrical body 156 of the variable motion-resistance component 154 of the integrated haptic unit 150, the integrated haptic unit 150 may be supported by having the bridging structure 152, which is on a first side of the scroll wheel 140 along the longitudinal axis 153 of the cylindrical body 156, and the second end 156b of the cylindrical body 156 of the variable motion-resistance component 154, which is on a second opposite side of the scroll wheel 140 along the longitudinal axis 153 of the cylindrical body 156, mounted to the housing 110 so as to suspend the scroll wheel 140.

According to various embodiments, the second end 156b of the cylindrical body 156 of the variable motion-resistance component 154 may include an axle stud 157 extending longitudinally from the second end 156b of the cylindrical body 156. Accordingly, the axle stud 157 may be protruding from the second end 156b of the cylindrical body 156. According to various embodiments, the axle stud 157 may include a short pin-like section 157a and a flanged head 157b. According to various embodiments, the axle stud 157 may be rotatably mounted to the housing 110 so as to rotatably support the second end 156b of the cylindrical body 156 from the portion of the housing 110. According to various embodiments, the first end 156a of the cylindrical body 156 of the variable motion-resistance component 154 may be of a smaller diameter than a main portion 156c of the cylindrical body 156 of the variable motion-resistance component 154 between the first end 156a and the second end 156b. According to various embodiments, the scroll wheel 140 may be attached to the main portion 156 of the cylindrical body 156 of the variable motion-resistance component 154. According to various embodiments, the cylindrical body 156 of the variable motion-resistance component 154 may include a stepped conical profile from the main portion 156c of the cylindrical body 156 to the first end 156a of the cylindrical body 156.

Figure 4A:
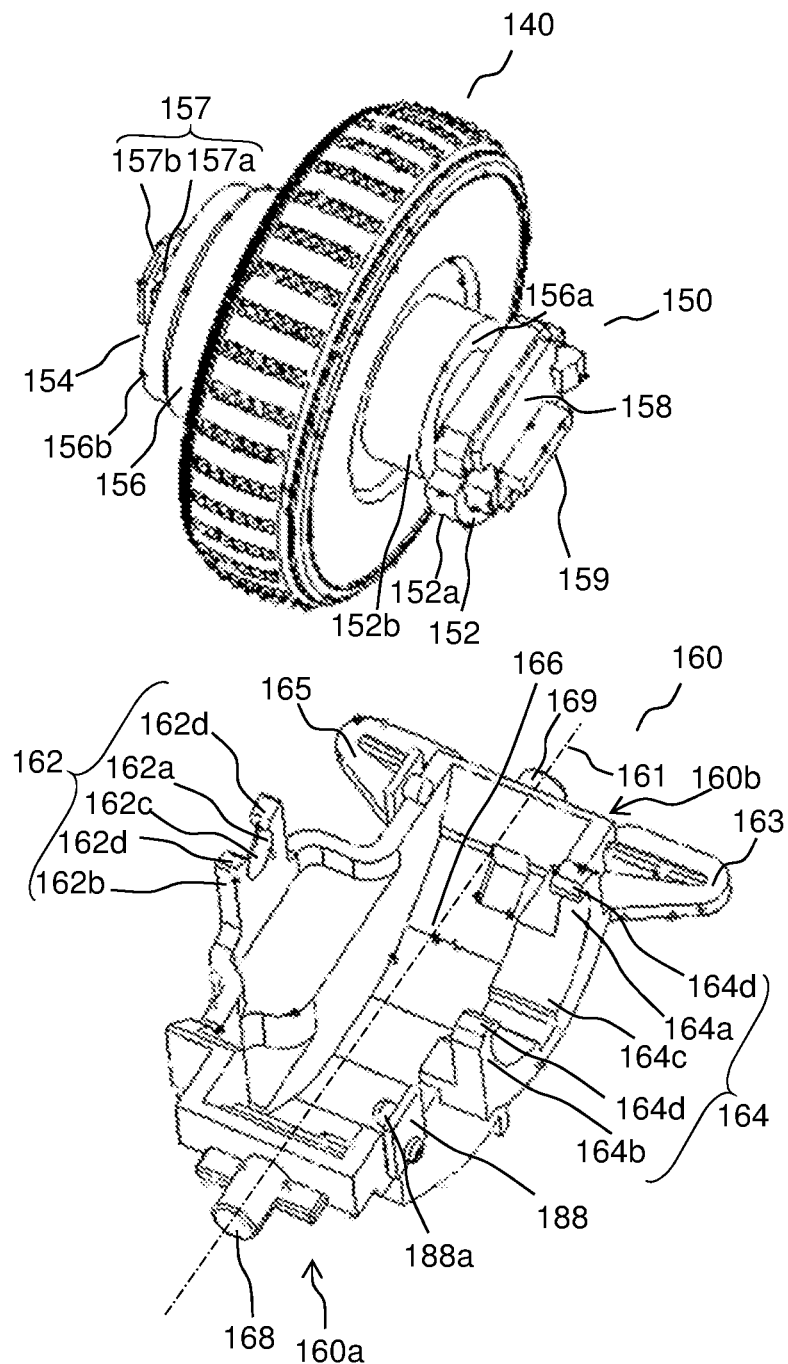
FIG. 4A shows a bracket separated from the assembled scroll wheel and integrated haptic unit of FIG. 3B according to various embodiments.
Figure 4B:
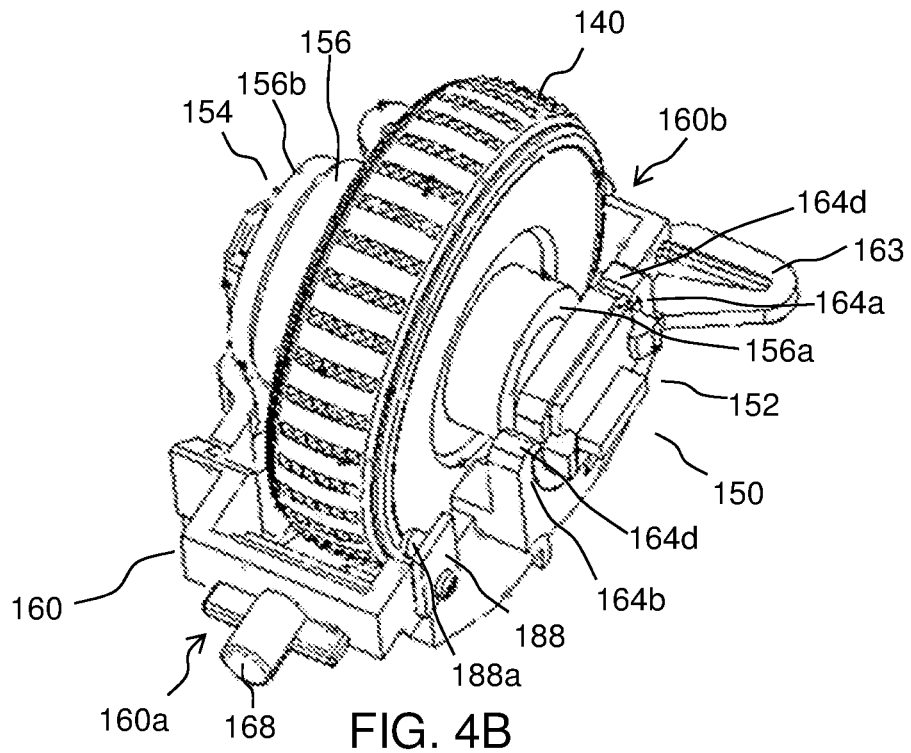
FIG. 4B to FIG. 4D show various view of the bracket, the scroll wheel and the integrated haptic unit assembled together according to various embodiments.
Figure 4C:
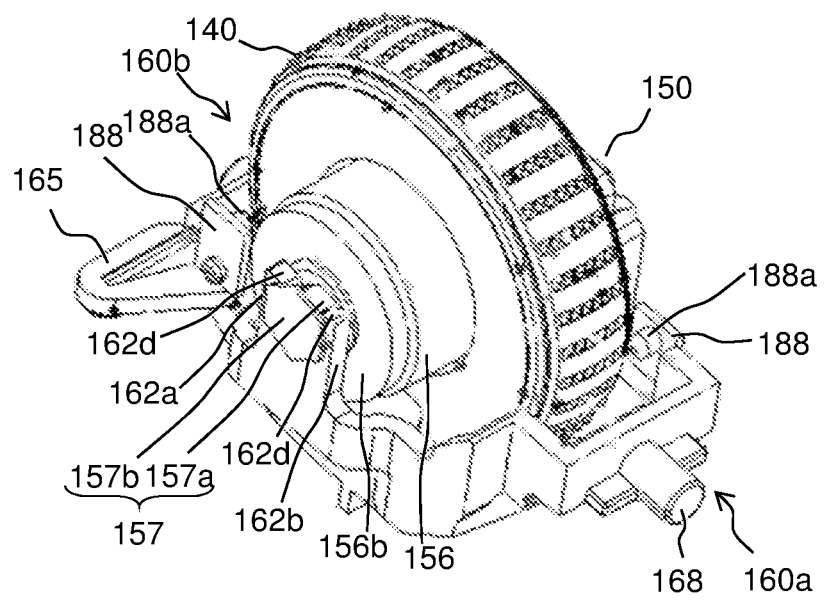
Figure 4D:
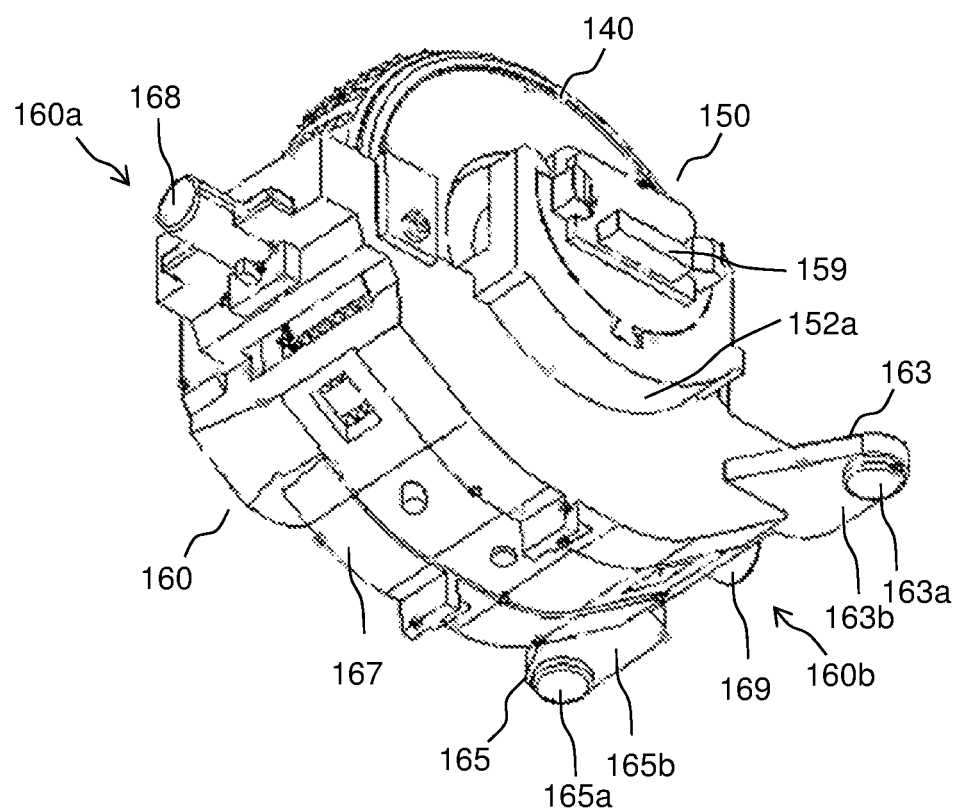

FIG. 4A shows a bracket 160 being apart from the assembled scroll wheel 140 and integrated haptic unit 150 according to various embodiments. FIG. 4B to FIG. 4D show various view of the bracket 160, the scroll wheel 140 and the integrated haptic unit 150 assembled together according to various embodiments. According to various embodiments, the input device, for example in the form of the mouse 100, may include the bracket 160. According to various embodiments, the integrated haptic unit 150 may be coupled to the bracket 160 for mounting to the housing 110 so as to suspend the scroll wheel 140. Accordingly, the integrated haptic unit 150 may be inserted through the scroll wheel 140, the integrated haptic unit 150 may be fitted to the bracket 160, and the bracket 160 may be mounted to the housing 110.

According to various embodiments, the bracket 160 may include a first socket 162 to receive the second end 156b of the cylindrical body 156 of the variable motion-resistance component 154 and a second socket 164 to receive the bridging structure 152. According to various embodiments, the first socket 162 may receive the axle stud 157 extending from the second end 156b of the cylindrical body 156 of the variable motion-resistance component 154. Hence the axle stud 157 at the second end 156b of the cylindrical body 156 may be fitted into the first socket 162. According to various embodiments, the second socket 164 may receive an underside section 152a of the bridging structure 152. Hence, the underside section 152a of the bridging structure 152 may be fitted into the second socket 164. According to various embodiments, the first socket 162 and the second socket 164 may be spaced apart such that the second end 156b of the cylindrical body 156 of the variable motion-resistance component 154 and the bridging structure 152 may be fitted respectively to the first socket 162 and the second socket 164. Accordingly, the first socket 162 and the second socket 164 of the bracket 160 may respectively support the second end 156b of the cylindrical body 156 of the variable motion-resistance component 154 and the bridging structure 152 so as to suspend the scroll wheel 140 between the first socket 162 and the second socket 164 of the bracket 160. According to various embodiments, each of the first socket 162 and the second socket 164 may include, but not limited to, a snap-fit socket, a snap-on socket, a clip-on socket, a socket clip, a socket clamp.

According to various embodiments, each socket of the first socket 162 and the second socket 164 of the bracket 160 may include a pair of opposing cantilever arms 162a, 162b, 164a, 164b extending from a seat portion 162c, 164c in a manner so as to form a U-shaped arrangement. According to various embodiments, the seat portion 162c of the first socket 162 may have a shape corresponding to a segment of the second end 156b of the cylindrical body 156 of the variable motion-resistance component 154 (for example, short pin-like section 157a of the axle stud 157 at the second end 156b of the cylindrical body 156). According to various embodiments, the seat portion 164c of the second socket 164 may have a shape corresponding to a segment of the bridging structure 152 (for example, the underside section 152a of the bridging structure 152). Accordingly, the second end 156b of the cylindrical body 156 of the variable motion-resistance component 154 and the bridging structure 152 may be respectively placed on or rested on or seated in or fitted to the seat portions 162c, 164c of the first socket 162 and the second socket 164. According to various embodiments, each of the pair of opposing cantilever arms 162a, 162b, 164a, 164b of the first socket 162 and the second socket 164 may have a hook-like element 162d, 164d at a tip. According to various embodiments, the hook-like elements 162d, 164d of the pair of opposing cantilever arms 162a, 162b, 164a, 164b may be directed towards each other. Accordingly, when the second end 156b of the cylindrical body 156 of the variable motion-resistance component 154 and the bridging structure 152 are placed on or rested on or seated in or fitted to the seat portions 162c, 164c of the first socket 162 and the second socket 164, the pair of opposing cantilever arms 162a, 162b, 164a, 164b may hook or snap or clip or clamp on the second end 156b of the cylindrical body 156 of the variable motion-resistance component 154 and the bridging structure 152 respectively so as to retain and hold the hub-haptic device 150 to the bracket 160.

According to various embodiments, the bracket 160 may be of an elongated shape. According to various embodiments, the first socket 162 and the second socket 164 may be on opposite longitudinal sides of the bracket 160. According to various embodiments, the first socket 162 and the second socket 164 may be on opposite length sides of the elongated bracket 160. According to various embodiments, the bracket 160 may include an elongate recess 166 in a center of the bracket 160. The elongate recess 166 may be longitudinally aligned and oriented with respect to the bracket 160. According to various embodiments, the elongate recess 166 may have a width and a length configured for a part of the scroll wheel 140 to be loosely fitted therewithin when the scroll wheel 140, the hub-haptic device 150 and the bracket 160 are coupled together. Accordingly, with the second end 156b of the cylindrical body 156 of the variable motion-resistance component 154 and the bridging structure 152 respectively supported by the first socket 162 and the second socket 164 of the bracket 160, part of the scroll wheel 140 may extend into the elongate recess 166 of the bracket 160 so as to be concealed or surrounded by the bracket 160.

According to various embodiments, the bracket 160 may have a first protrusion 168 extending longitudinally outwards along a longitudinal axis 161 of the bracket 160 at a first longitudinal end 160a of the bracket 160 and a second protrusion 169 extending longitudinally outwards along the longitudinal axis 161 of the bracket 160 at a second longitudinal end 160b of the bracket 160. Accordingly, the first protrusion 168 may be extending away from the first longitudinal end 160a of the bracket 160 and the second protrusion 169 may be extending away from the second longitudinal end 160b of the bracket 160. Hence, the first protrusion 168 and the second protrusion 169 may be extending away from each other in opposite directions along the longitudinal axis 161 of the bracket 160 and from respective longitudinal ends 160a, 160b of the bracket 160. According to various embodiments, each of the first protrusion 168 and the second protrusion 169 may be of a cylindrical shape.

Figure 5A:
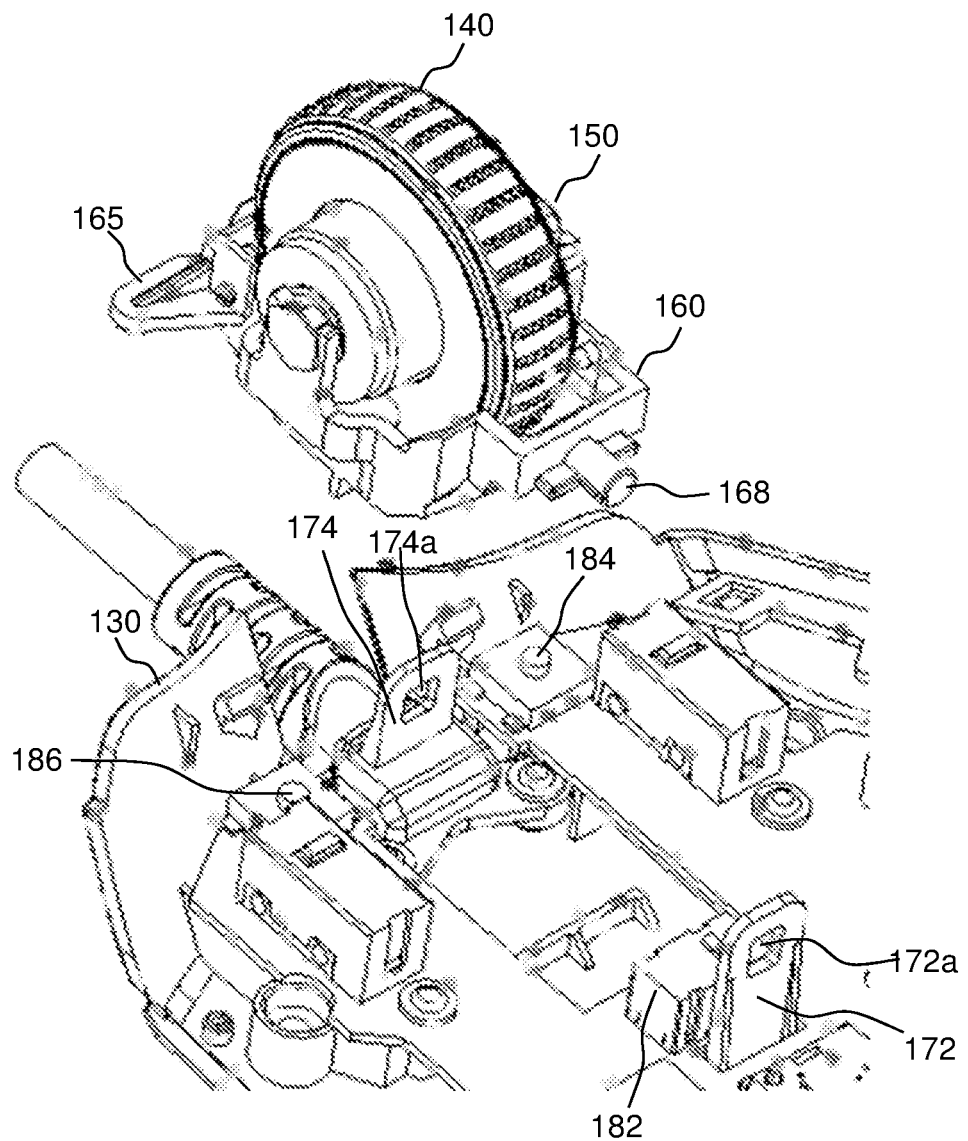
FIG. 5A shows a portion of the housing 110 and the assembled scroll wheel, integrated haptic unit and bracket of FIG. 4B to FIG. 4D separated from the portion of the housing according to various embodiments.
Figure 5B:
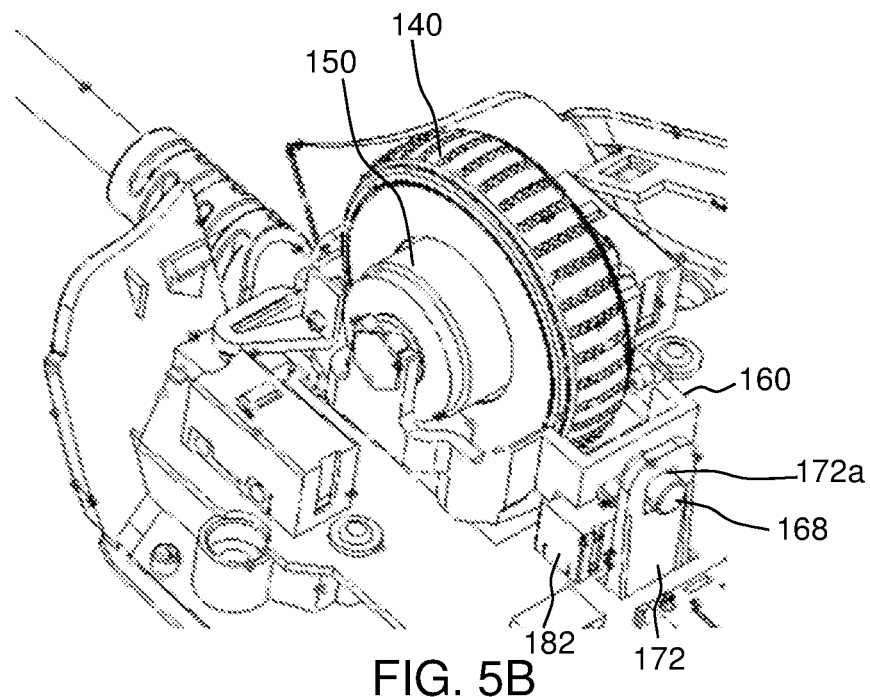
FIG. 5B and FIG. 5C show various views of the portion of the housing, the bracket, the scroll wheel and the integrated haptic unit assembled together according to various embodiments.
Figure 5C:
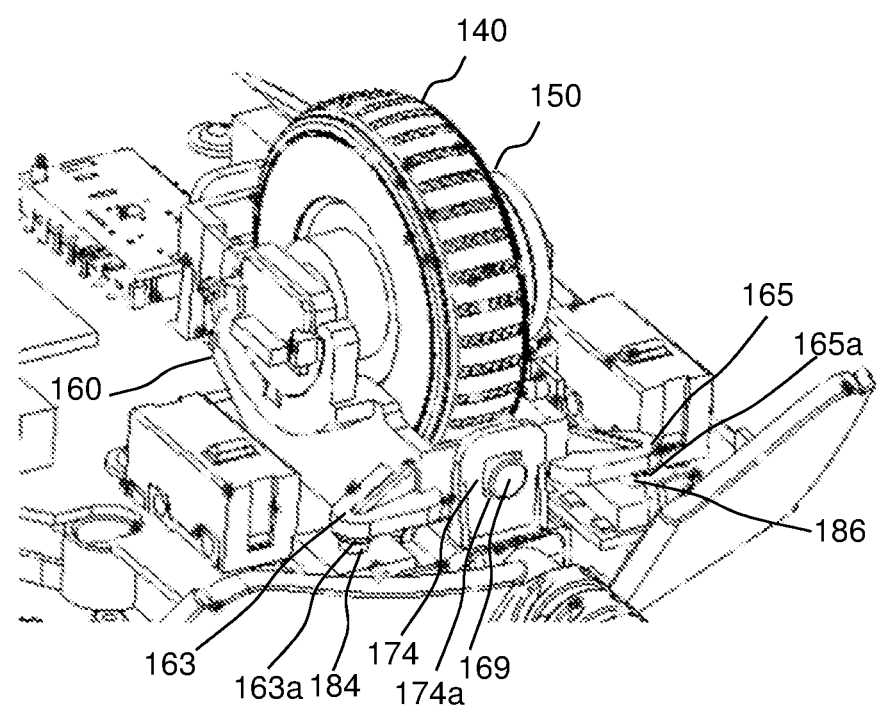
Figure 5D:
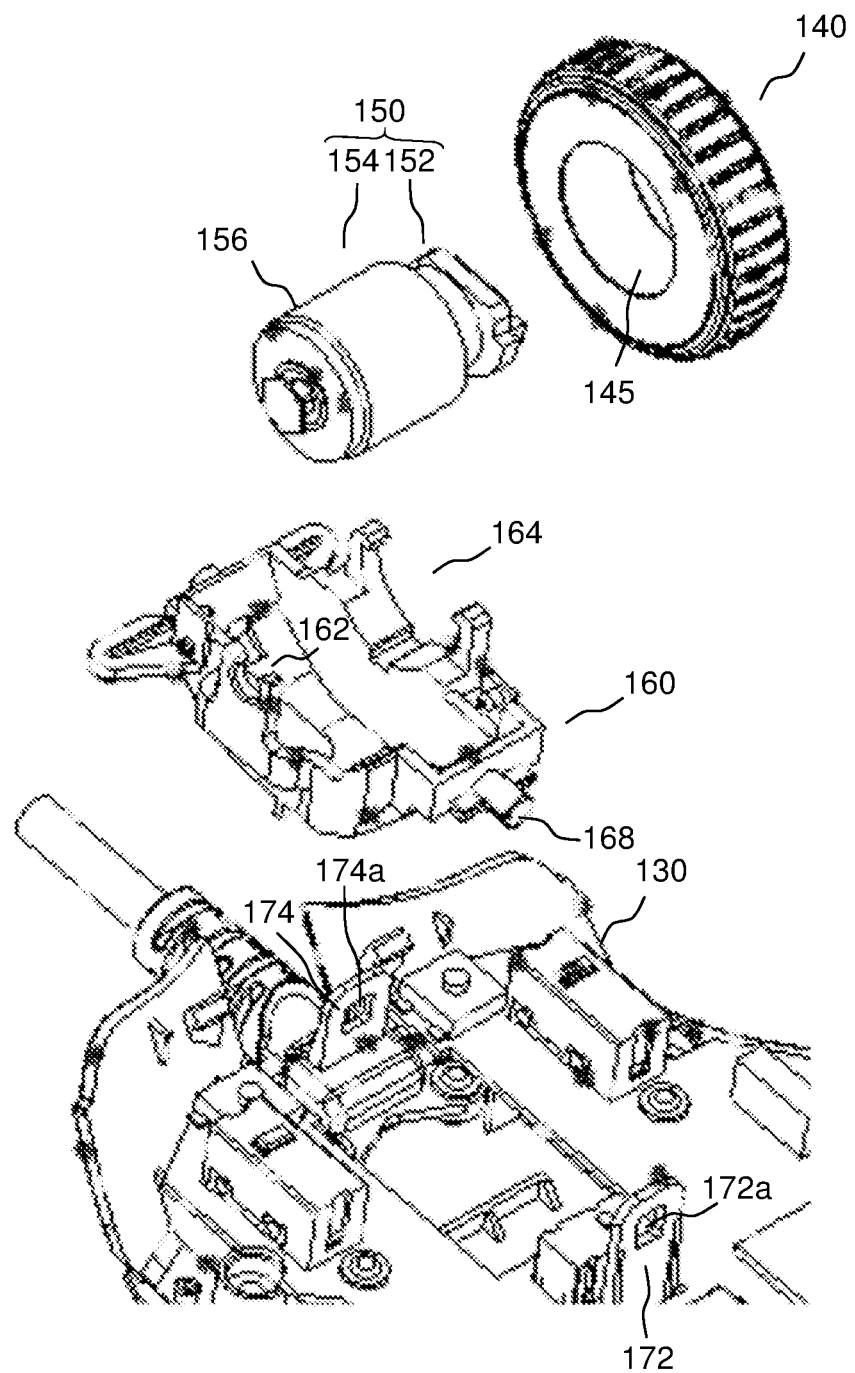
FIG. 5D shows the portion of the housing, the bracket, the scroll wheel and the integrated haptic unit disassembled from each other according to various embodiments.

FIG. 5A shows a portion (or the base portion 130) of the housing 110 being apart from the assembled scroll wheel 140, integrated haptic unit 150 and bracket 160 of FIG. 4B to FIG. 4C according to various embodiments. FIG. 5B and FIG. 5C show various views of the base portion 130 of the housing 110, the bracket 160, the scroll wheel 140 and the integrated haptic unit 150 assembled together according to various embodiments. FIG. 5D shows the base portion 130 of the housing 110, the bracket 160, the scroll wheel 140 and the integrated haptic unit 150 disassembled from each other according to various embodiments.

According to various embodiments, the housing 110 may include a pair of opposing holder structures 172, 174, i.e. a first holder structure 172 and a second holder structure 174, extending upright from the base portion 130 of the housing 110. According to various embodiments, each of the pair of opposing holder structures 172, 174 may include, but not limited to, a column, a pillar, a vertical wall, or an upright plate. According to various embodiments, the pair of opposing holder structures 172, 174, may be spaced apart from each other and may be facing each other. According to various embodiments, each of the pair of opposing holder structure 172, 174, may include a hole 172a, 174a. According to various embodiments, the holes 172a, 174a of the pair of opposing holder structures 172, 174 may be located towards respective tips of the pair of opposing holder structures 172, 174. According to various embodiments, the holes 172a, 174a of the pair of opposing holder structures 172, 174 may be directed towards each other. Accordingly, the holes 172a, 174a of the pair of opposing holder structures 172, 174 may be aligned to each other such that a straight line may pass through the holes 172a, 174a of the pair of opposing holder structures 172, 174. According to various embodiments, each of the holes 172a, 174a of the pair of opposing holder structures 172, 174 may be may be of a quadrilateral shape. For example, as shown, the hole 174a of the second holder structure 174 may be a square and the hole 172a of the first holder structure 172 may be a rectangle.

According to various embodiments, the bracket 160 may be mounted to the pair of opposing holder structures 172, 174 with the first protrusion 168 of the bracket 160 and the second protrusion 169 of the bracket 160 respectively inserted into the holes 172a, 174a of the pair of opposing holder structures 172, 174 in a manner such that the bracket 160 may be pivotable about the longitudinal axis 161 of the bracket 160 with respect to the housing 110. Accordingly, the bracket 160 may be mounted to the base portion 130 of the housing 110 with the first protrusion 168 of the bracket 160 fitted into the hole 172a of the first holder structure 172 and the second protrusion 169 of the bracket 160 fitted into the hole 174a of the second holder structure 174 such that the engagement between the first protrusion 168 and the second protrusion 169 with the holes 172a, 174a of the pair of opposing holder structures 172, 174 may form a pivot joint between the bracket 160 and the base portion 130 of the housing 110.

According to various embodiments, the hole 172a of the first bracket holder structure 172 of the pair of opposing bracket holder structures 172, 174 receiving the first protrusion 168 of the bracket 160 may be larger in a vertical dimension than that of the first protrusion 168 of the bracket 160. Accordingly, a height of the hole 172a of the first bracket holder structure 172 or a dimension of the hole 172a along an upright extension direction of the first bracket holder structure 172 may be larger or bigger than that of the first protrusion 168 of the bracket 160. Hence, the first longitudinal end 160a of the bracket 160 may be pivotable about the second protrusion 169 of the bracket 160, which is fitted into the hole 174a of the second bracket holder structure 174. Thus, the first protrusion 168 of the bracket 160 may be movable vertically or along the upright extension direction with respect to the first bracket holder structure 172. According to various embodiments, in addition to being pivotable about the longitudinal axis 161 of the bracket 160, the bracket 160 may also be rocked with the first longitudinal end 160a of the bracket 160 moving in a up/down motion with respect to the second longitudinal end 160b of the bracket 160 as a pivot.

According to various embodiments, a portion of the underneath surface 167 of the bracket 160 towards the first longitudinal end 160a of the bracket 160 may be abutting a click switch 182 disposed between the bracket 160 and the base portion 130 of the housing 110. Accordingly, input device, for example in the form of the mouse 100, may include the click switch 182 at the base portion 130 of the housing 110. According to various embodiments, the bracket 160 may be mounted to the base portion 130 of the housing 110 with the click switch 182 below the portion of the underneath surface 167 of the bracket 160 towards the first longitudinal end 160a of the bracket 160. According to various embodiments, when the first longitudinal end 160a of the bracket 160 is moved up and down with respect to the second longitudinal end 160b of the bracket 160 as the pivot, the click switch 182 may be activated by the bracket 160 as the bracket 160 depressed the click switch 182. Accordingly, since the scroll wheel 140 is attached to the integrated haptic unit 150 fitted to the bracket 160, the user may depress the scroll wheel 140 to move or rock the first longitudinal end 160a of the bracket 160 with respect to the second longitudinal end 160b of the bracket 160 so as to activate the click switch 182.

According to various embodiments, the bracket 160 may include a first plate-like appendage 163 and a second plate-like appendage 165 respectively extending laterally from the second longitudinal end 160b of the bracket 160 in a symmetrical manner with respect to the longitudinal axis 161 of the bracket 160. Accordingly, the first plate-like appendage 163 and the second plate-like appendage 165 may be extending in a planar manner in a transverse plane of the bracket 160 and may be a mirror image of each other with respect to the longitudinal axis 161 of the bracket 160. The transverse plane of the bracket 160 may be a horizontal plane slicing the bracket 160 between a top and a bottom in a direction parallel to or coinciding with the longitudinal axis 161 of the bracket 160. Further, the first plate-like appendage 163 and the second plate-like appendage 165 may be symmetrical to each other about the longitudinal axis 161 of the bracket 160. According to various embodiments, the first plate-like appendage 163 and the second plate-like appendage 165 may be respectively extending from the two corners of the bracket 160 at the second longitudinal end 160b. According to various embodiments, each of the first plate-like appendage 163 and the second plate-like appendage 165 may have a protrusion 163a, 165a extending downwards from an underneath surface 163b, 165b thereof. Accordingly, the protrusions 163a, 165a of the first plate-like appendage 163 and the second plate-like appendage 165 may be respectively protruding perpendicularly from the underneath surface 163b, 165b of the first plate-like appendage 163 and the second plate-like appendage 165.

According to various embodiments, the protrusions 163a, 165a of the first plate-like appendage 163 and the second plate-like appendage 165 may be respectively abutting a first tilt switch 184 and a second tilt switch 186 disposed between the bracket 160 and the base portion 130 of the housing 110. Accordingly, the protrusion 163a of the first plate-like appendage 163 may be abutting the first tilt switch 184 and the protrusion 165a of the second plate-like appendage 165 may be abutting the second tilt switch 186. According to various embodiments, the input device, for example in the form of the mouse 100, may include the first tilt switch 184 and the second tilt switch 186 disposed at the base portion 130 of the housing 110. According to various embodiments, the bracket 160 may be mounted to the base portion 130 of the housing 110 such that the first plate-like appendage 163 is above the first tilt switch 184 and the second plate-like appendage 165 is above the second tilt switch 186. According to various embodiments, since the bracket 160 is pivotable about the longitudinal axis 161 with respect to the base portion 130 of the housing 110, the bracket 160 may be pivoted or tilted in a first direction such that the protrusion 163a of the first plate-like appendage 163 may depress and activate the first tilt switch 184, and the bracket 160 may be pivoted or tilted in a second opposite direction such that the protrusion 165a of the second plate-like appendage 165 may depress and activate the second tilt switch 186. Accordingly, since the scroll wheel 140 is attached to the integrated haptic unit 150 fitted to the bracket 160, the user may tilt the scroll wheel 140 left or right to pivot the bracket 160 in the first direction or the second opposite direction about the longitudinal axis 161 with respect to the base portion 130 of the housing 110 so as to activate the first tilt switch 184 or the second tilt switch 186.

According to various embodiments, the input device, for example in the form of the mouse 100, may include a lighting unit 188. According to various embodiments, the lighting unit 188 may be coupled to the bracket 160 for illuminating the scroll wheel 140. According to various embodiments, the lighting unit 188 may include one or more light source 188a, such as a light emitting diode (LED), coupled to the bracket 160 in a manner such that light from the light source 188a may be projected to the scroll wheel 140. According to various embodiments, the one or more light source 188a may be disposed beside one of the pair of sockets 162, 164 of the bracket 160 such that the light may be projected onto the scroll wheel 140. According to various embodiments, the lighting unit 188 may be connected to the electronic circuit assembly of the input device such that the electronic circuit assembly of the input device may control the lighting sequences or pattern of the lighting unit 188.

According to various embodiments, the input device, for example in the form of the mouse 100, may include at least two lighting units 188. According to various embodiments, the at least two lighting units 188 may be coupled to the bracket 160 respectively beside the pair of sockets 162, 164. Accordingly, the at least two lighting units 188 may illuminate both sides of the scroll wheel 140.

Figure 6:
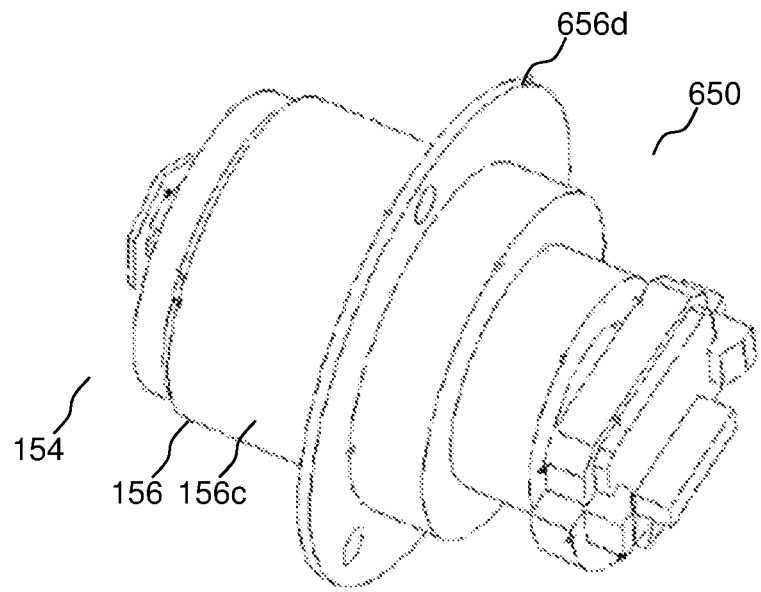
FIG. 6 shows a variant of an integrated haptic unit for the input device according to various embodiments.

FIG. 6 shows a variant of an integrated haptic unit 650 for the input device according to various embodiments. According to various embodiments, as shown, the integrated haptic unit 650 may include all the features and limitations of the integrated haptic unit 150 as described with reference to FIG. 3A to FIG. 5D. According to various embodiments, the integrated haptic unit 650 may additionally include that the cylindrical body 156 of the variable motion-resistance component 154 may further include a flange mount 656d around the cylindrical body 156. The flange mount 656d may be extending radially from the main portion 156c of the cylindrical body 156 to which the scroll wheel 140 may be attached. According to various embodiments, the flange mount 656d may be configured for fastening the scroll wheel 140 to the cylindrical body 156 of the variable motion-resistance component 154 of the integrated haptic unit 650.

Figure 7A:
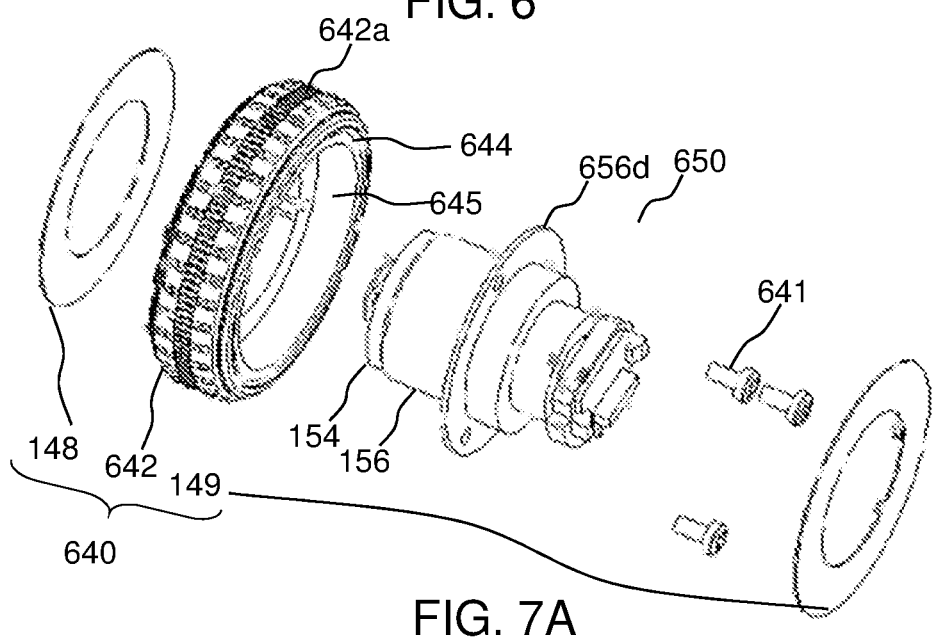
FIG. 7A and FIG. 7B show various disassembled views of a variant of a scroll wheel and the integrated haptic unit of FIG. 6 according to various embodiments.
Figure 7B:
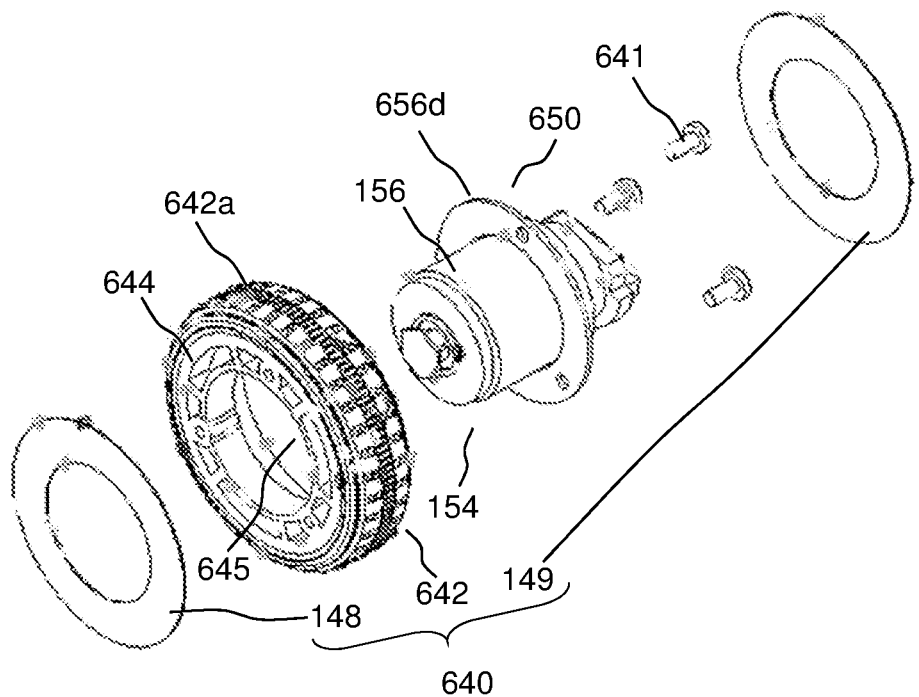
Figure 7C:
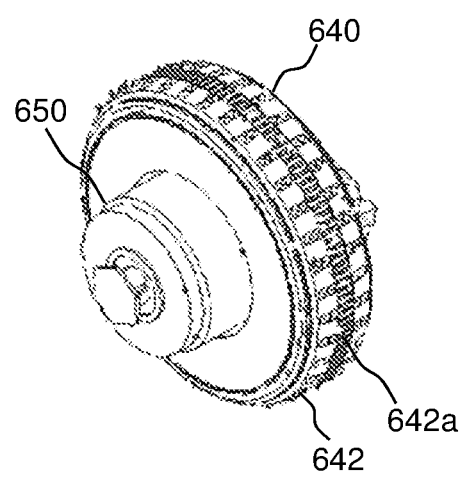
FIG. 7C shows an assembled view of FIG. 7A and FIG. 7B according to various embodiments.

FIG. 7A and FIG. 7B show various disassembled views of a variant of a scroll wheel 640 and the integrated haptic unit 650 of FIG. 6 according to various embodiments. FIG. 7C shows an assembled view of the scroll wheel 640 and the integrated haptic unit 650 according to various embodiments. According to various embodiments, the scroll wheel 640 may, similar to the scroll wheel 140 of FIG. 2A, be in the shape of a ring. Accordingly, the scroll wheel 640 may be of a ring-shaped structure having a circular band with a through-hole 645 in a center of the ring-shaped structure. According to various embodiments, the scroll wheel 640 may include an outer cylindrical surface 642. The outer cylindrical surface 642 of the scroll wheel 640 may be textured for gripping so as to facilitate rotating of the scroll wheel 640 by the user. According to various embodiments, the outer cylindrical surface 642 of the scroll wheel 640 may include a ring of light guide 642a around the middle of the outer cylindrical surface 642.

According to various embodiments, the scroll wheel 640 may, similar to the scroll wheel 140 of FIG. 2A, include an inner rim 644, a first annular plate 148 and a second annular plate 149. According to various embodiments, the inner rim 644 may be the shape of a ring having the through-hole 645 in the center of the inner rim 644. According to various embodiments, the outer cylindrical surface 642 may be fitted over the inner rim 644 to surround the inner rim 644. According to various embodiments, the inner rim 644 may be configured to be mounted to the flange mount 656d of the cylindrical body 156 of the variable motion-resistance component 154 of the integrated haptic unit 650. According to various embodiments, the scroll wheel 640 may be attached to the cylindrical body 156 of the variable motion-resistance component 154 of the integrated haptic unit 650 via screws 641 connecting the flange mount 656d of the cylindrical body 156 to the inner rim 644 of the scroll wheel 640. According to various embodiments, the first annular plate 148 may be attached to a first planar side of the inner rim 644 of the scroll wheel 640 and the second annular plate 149 may be attached to a second planar side of the inner rim 644 of the scroll wheel 640.

Figure 8A:
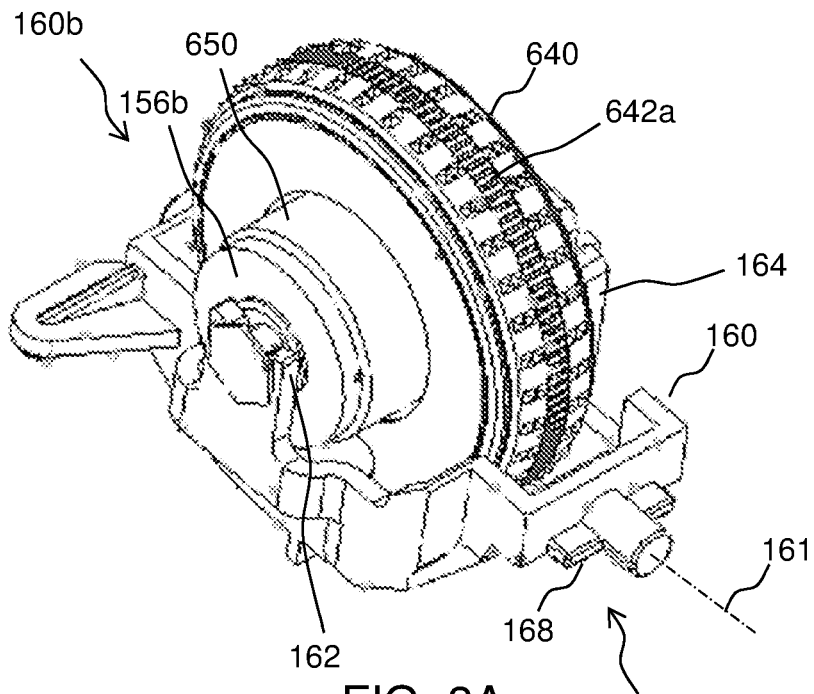
FIG. 8A and FIG. 8B show various views of a variant of a bracket, the scroll wheel of FIG. 7A and the integrated haptic unit of FIG. 6 assembled together according to various embodiments.
Figure 8B:
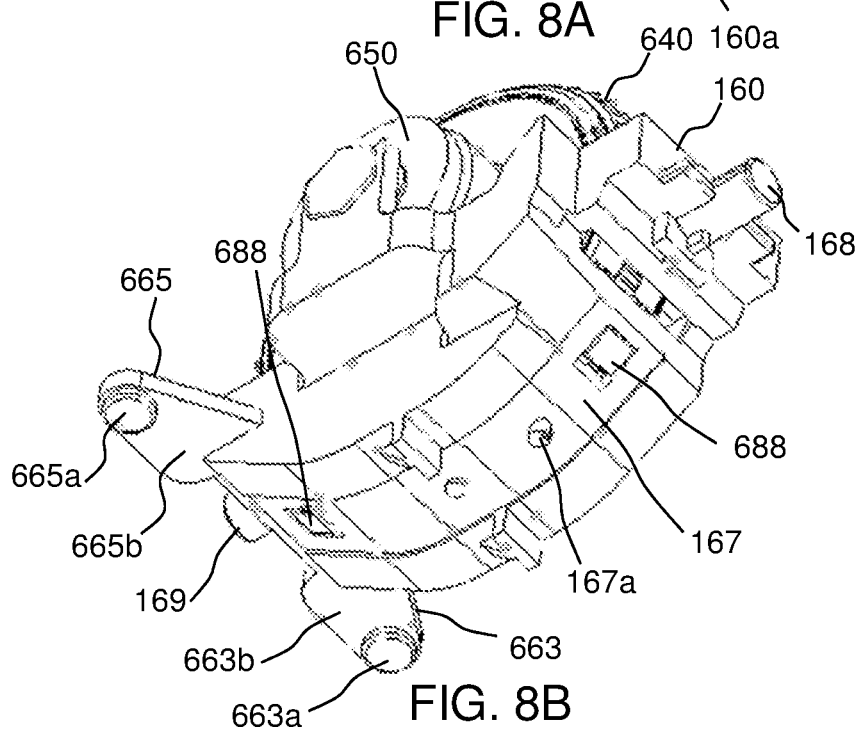

FIG. 8A and FIG. 8B show various views of the bracket 160, the scroll wheel 640 and the integrated haptic unit 650 assembled together according to various embodiments. According to various embodiments, the second end 156b of the cylindrical body 156 of the variable motion-resistance component 154 of the integrated haptic unit 650 and the bridging structure 152 may be respectively received in the first socket 162 and the second socket 164 of the bracket 160. According to various embodiments, as shown, the first plate-like appendage 163 and the second plate-like appendage 165 of the bracket 160 may be of a triangular plate shape. However, it is understood that the first plate-like appendage 163 and the second plate-like appendage 165 of the bracket 160 may be of other shapes, such as a quadrilateral plate shape.

According to various embodiments, a portion of an underneath surface 167 of the bracket 160 towards the first longitudinal end 160a of the bracket 160 may include a downward protrusion 167a for abutting the click switch 182 when the bracket 160 is depressed or pushed downwards towards the click switch 182.

According to various embodiments, a lighting unit 688 may be coupled to the bracket 160 for illuminating the scroll wheel 640. According to various embodiments, the lighting unit 688 may include one or more light source, such as a light emitting diode (LED), coupled to the bracket 160 in a manner such that light from the light source of the lighting unit 688 may be projected to the light guide 642a of the scroll wheel 640. According to various embodiments, the lighting unit 688 may be disposed along a centerline of the underneath surface 167 of the bracket 160 such that the light may be projected to the light guide 642a of the scroll wheel 640. According to various embodiments, the lighting unit 688 may be connected to the electronic circuit assembly of the input device such that the electronic circuit assembly of the input device may control the lighting sequences or pattern of the lighting unit 688.

According to various embodiments, there may be at least two lighting units 688. According to various embodiments, the at least two lighting units 688 may respectively disposed towards the first longitudinal end 160a and the second longitudinal end 160b of the bracket 160 along the centerline. Accordingly, the at least two lighting units 688 may illuminate the light guide 642a of the scroll wheel 640 from underneath the scroll wheel 640.

The following examples pertain to various embodiments.

Example 1 is an input device including:
a housing;
a ring-shaped scroll wheel; and
an integrated haptic unit inserted through the scroll wheel, the integrated haptic unit comprising
a bridging structure,
a variable motion-resistance component coupled to the bridging structure, the variable motion-resistance component being rotatable relative to the bridging structure about a rotational axis, wherein the scroll wheel is fixedly attached to the cylindrical body in a coaxial manner with respect to the rotational axis, wherein the variable motion-resistance component varies a motion-resistance profile against a relative rotation motion between the variable motion-resistance component and the bridging structure based on an input control signal received by the integrated haptic unit for defining a haptic behavior of the scroll wheel, and
an encoder built into the bridging structure to convert an angular displacement or motion between the variable motion-resistance component and the bridging structure as an output signal from the integrated haptic unit,
wherein the integrated haptic unit is mounted to the housing in a manner so as to suspend the integrated haptic unit and the scroll wheel from a portion of the housing.

In Example 2, the subject matter of Example 1 may optionally include that the variable motion-resistance component may include a cylindrical body with a first end directed towards the bridging structure, the cylindrical body being rotatable relative to the bridging structure about a longitudinal axis of the cylindrical body, wherein the longitudinal axis of the cylindrical body coincides with the rotational axis of the variable motion-resistance component.

In Example 3, the subject matter of Example 2 may optionally include that the first end of the cylindrical body of the variable motion-resistance component may be of a smaller diameter than a main portion of the cylindrical body.

In Example 4, the subject matter of any one of Examples 2 or 3 may optionally include that integrated haptic unit may be mounted to the housing with a second end of the cylindrical body of the variable motion-resistance component and the bridging structure respectively supported in a manner so as to suspend the scroll wheel from the portion of the housing.

In Example 5, the subject matter of Example 4 may optionally include that the second end of the cylindrical body of the variable motion-resistance component may include an axle stud extending longitudinally, the axle stud being rotatably mounted to the housing so as to rotatably support the second end of the cylindrical body from the portion of the housing.

In Example 6, the subject matter of Example 4 or 5 may optionally include a bracket, wherein the integrated haptic unit may be coupled to the bracket for mounting to the housing, and wherein the bracket may include a first socket to receive the second end of the cylindrical body of the variable motion-resistance component and a second socket to receive the bridging structure.

In Example 7, the subject matter of Example 6 may optionally include that each of the first socket and the second socket may include a snap-fit socket, a snap-on socket, a clip-on socket, a socket clip, or a socket clamp.

In Example 8, the subject matter of Example 6 or 7 may optionally include that each of the first socket and the second socket may include a pair of opposing cantilever arms extending from a seat portion in a manner so as to form a U-shaped arrangement, and wherein each of the pair of opposing cantilever arms may have a hook-like element at a tip, the hook-like elements of the pair of opposing cantilever arms being directed towards each other.

In Example 9, the subject matter of any one of Examples 6 to 8 may optionally include that the bracket may be of an elongated shape, wherein the pair of sockets may be on opposite longitudinal sides of the bracket.

In Example 10, the subject matter of Example 9 may optionally include that the bracket may have a first protrusion extending longitudinally outwards along a longitudinal axis of the bracket from a first longitudinal end of the bracket and a second protrusion extending longitudinally outwards along the longitudinal axis of the bracket from a second longitudinal end of the bracket.

In Example 11, the subject matter of Example 10 may optionally include that the housing may include a pair of opposing holder structures extending upright from the portion of the housing, wherein each of the pair of opposing holder structures may have a hole, the holes of the pair of opposing holder structures being directed towards each other, wherein the bracket may be mounted to the pair of opposing holder structures with the first protrusion and the second protrusion of the bracket respectively inserted into the holes of the pair of opposing holder structures in a manner such that the bracket may be pivotable about the longitudinal axis of the bracket with respect to the housing.

In Example 12, the subject matter of Example 11 may optionally include that the hole of a first bracket holder structure of the pair of opposing bracket holder structures receiving the first protrusion of the bracket may be larger in a vertical dimension than that of the first protrusion of the bracket such that the first longitudinal end of the bracket may be movable vertically relative to the first bracket holder structure so as to be pivotable about the second protrusion of the bracket.

In Example 13, the subject matter of Example 12 may optionally include that an underneath surface of the bracket towards the first longitudinal end of the bracket may be abutting a click switch disposed between the bracket and the portion of the housing.

In Example 14, the subject matter of any one of Examples 11 to 13 may optionally include that the bracket may include a first plate-like appendage and a second plate-like appendage respectively extending laterally from the second longitudinal end of the bracket in a symmetrical manner with respect to the longitudinal axis of the bracket, each of the first plate-like appendage and the second plate-like appendage having a protrusion extending downwards from an underneath surface thereof, wherein the protrusions of the first plate-like appendage and the second plate-like appendage may respectively be abutting a first tilt switch and a second tilt switch disposed between the bracket and the portion of the housing.

In Example 15, the subject matter of any one of Examples 4 to 14 may optionally include that the bridging structure may include one or more electrical connection ports.

In Example 16, the subject matter of any one of Examples 6 to 15 may optionally include a lighting unit having at least one light source, the lighting unit may be coupled to the bracket for illuminating the scroll wheel.

In Example 17, the subject matter of any one of Examples 1 to 16 may optionally include that the variable motion-resistance component may include any one or a combination of an internal magnetic elements arrangement, an internal electro-magnetic elements arrangement, an internal electrical elements arrangement, an internal electrorheological fluid arrangement, or an internal magnetorheological fluid arrangement for varying the motion-resistance profile against the relative rotation motion between the cylindrical body and the bridging structure Example 18 is an input device including:
a housing;
a ring-shaped scroll wheel; and
a haptic unit inserted through the scroll wheel, the haptic unit comprising
  a bridging structure,
  a fluid based variable motion-resistance component coupled to the bridging structure, the fluid based variable motion-resistance component having a cylindrical body with a first end directed towards the bridging structure, the cylindrical body being rotatable relative to the bridging structure about a longitudinal axis of the cylindrical body, wherein the scroll wheel is fixedly attached to the cylindrical body in a coaxial manner, the fluid based variable motion-resistance component varies a motion-resistance profile against a relative rotation motion between the cylindrical body and the bridging structure based on an input control signal received by the integrated haptic unit for defining a haptic behavior of the scroll wheel,
  wherein the haptic unit is mounted to the housing in a manner so as to suspend the integrated haptic unit and the scroll wheel from a portion of the housing.

In Example 19, the subject matter of Example 18 may optionally include that the fluid based variable motion-resistance component is configured to vary a magnetic field applied across a fluid inside the cylindrical body based on the input control signal to vary a flow behavior of the fluid so as to vary the motion-resistance profile against the relative rotation motion between the cylindrical body and the bridging structure for defining the haptic behavior of the scroll wheel.

In Example 20, the subject matter of Example 18 of 19 may optionally include that the fluid based variable motion-resistance component may be based on magnetorheological fluid or electrorheological fluid.

Example 21 is an input device including:
a housing;
a ring-shaped scroll wheel;
an integrated haptic unit inserted through the scroll wheel, the integrated haptic unit comprising
  a bridging structure,
  a variable motion-resistance component coupled to the bridging structure, the variable motion-resistance component having a cylindrical body with a first end directed towards the bridging structure, the cylindrical body being rotatable relative to the bridging structure about a longitudinal axis of the cylindrical body, wherein the scroll wheel is fixedly attached to the cylindrical body in a coaxial manner, wherein the variable motion-resistance component varies a motion-resistance profile against a relative rotation motion between the cylindrical body and the bridging structure based on an input control signal received by the integrated haptic unit for defining a haptic behavior of the scroll wheel; and
a bracket coupled to the integrated haptic unit, the bracket being mounted to a portion of the housing,
  wherein the bracket includes a first socket and a second socket, wherein the integrated haptic unit is coupled to the bracket with a second end of the cylindrical body of the variable motion-resistance component fitted into the first socket and the bridging structure fitted into the second socket in a manner so as to suspend the scroll wheel from the portion of the housing between the pair of sockets.

In Example 22, the subject matter of Example 21 may optionally include that the first end of the cylindrical body of the variable motion-resistance component may be of a smaller diameter than a main portion of the cylindrical body.

In Example 23, the subject matter of Example 21 or 22 may optionally include that the second end of the cylindrical body of the variable motion-resistance component may include an axle stud extending longitudinally, the axle stud being rotatably fitted into the first socket so as to rotatably support the second end of the cylindrical body from the portion of the housing.

In Example 24, the subject matter of any one of Examples 21 to 23 may optionally include that each of the first socket and the second socket may include a snap-fit socket, a snap-on socket, a clip-on socket, a socket clip, or a socket clamp.

In Example 25, the subject matter of any one of Examples 21 to 24 may optionally include that each of the first socket and the second socket may include a pair of opposing cantilever arms extending from a seat portion in a manner so as to form a U-shaped arrangement, and wherein each of the pair of opposing cantilever arms may have a hook-like element at a tip, the hook-like elements of the pair of opposing cantilever arms being directed towards each other.

In Example 26, the subject matter of any one of Examples 21 to 25 may optionally include that the bracket may be of an elongated shape, wherein the first socket and the second socket may be on opposite longitudinal sides of the bracket.

In Example 27, the subject matter of Example 26 may optionally include that the bracket may have a first protrusion extending longitudinally outwards along a longitudinal axis of the bracket from a first longitudinal end of the bracket and a second protrusion extending longitudinally outwards along the longitudinal axis of the bracket from a second longitudinal end of the bracket.

In Example 28, the subject matter of Example 27 may optionally include that the housing may include a pair of opposing holder structures extending upright from the portion of the housing, wherein each of the pair of opposing holder structures may have a hole, the holes of the pair of opposing holder structures being directed towards each other, wherein the bracket may be mounted to the pair of opposing holder structures with the first protrusion and the second protrusion of the bracket respectively inserted into the holes of the pair of opposing holder structures in a manner such that the bracket may be pivotable about the longitudinal axis of the bracket with respect to the housing.

In Example 29, the subject matter of Example 28 may optionally include that hole of a first bracket holder structure of the pair of opposing bracket holder structures receiving the first protrusion of the bracket may be larger in a vertical dimension than that of the first protrusion of the bracket such that the first longitudinal end of the bracket may be movable vertically relative to the first bracket holder structure so as to be pivotable about the second protrusion of the bracket.

In Example 30, the subject matter of Example 29 may optionally include that an underneath surface of the bracket towards the first longitudinal end of the bracket may be abutting a click switch disposed between the bracket and the portion of the housing.

In Example 31, the subject matter of any one of Examples 28 to 30 may optionally include that the bracket may include a first plate-like appendage and a second plate-like appendage respectively extending laterally from the second longitudinal end of the bracket in a symmetrical manner with respect to the longitudinal axis of the bracket, each of the first plate-like appendage and the second plate-like appendage having a protrusion extending downwards from an underneath surface thereof, wherein the protrusions of the first plate-like appendage and the second plate-like appendage may be respectively abutting a first tilt switch and a second tilt switch disposed between the bracket and the portion of the housing.

In Example 32, the subject matter of any one of Examples 21 to 31 may optionally include that the bridging structure may include one or more electrical connection ports.

In Example 33, the subject matter of any one of Examples 21 to 32 may optionally include a lighting unit having at least one light source, the lighting unit may be coupled to the bracket for illuminating the scroll wheel.

Various embodiments have provided an input device having a scroll wheel, wherein the haptic behavior of the scroll wheel is customizable.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. An input device comprising
a housing;
a ring-shaped scroll wheel; and
an integrated haptic unit inserted through the scroll wheel,
the integrated haptic unit comprising
a bridging structure,
a variable motion-resistance component coupled to the bridging structure, the variable motion-resistance component being rotatable relative to the bridging structure about a rotational axis, wherein the scroll wheel is fixedly attached to the variable motion-resistance component in a coaxial manner with respect to the rotational axis, wherein the variable motion-resistance component varies a motion-resistance profile against a relative rotation motion between the variable motion-resistance component and the bridging structure based on an input control signal received by the integrated haptic unit for defining a haptic behavior of the scroll wheel, and
an encoder built into the bridging structure to convert an angular displacement or motion between the variable motion-resistance component and the bridging structure as an output signal from the integrated haptic unit,
wherein the integrated haptic unit is mounted to the housing in a manner so as to suspend the integrated haptic unit and the scroll wheel from a portion of the housing.

2. The input device as claimed in claim 1, wherein the variable motion-resistance component has a cylindrical body with a first end directed towards the bridging structure, the cylindrical body being rotatable relative to the bridging structure about a longitudinal axis of the cylindrical body, wherein the longitudinal axis of the cylindrical body coincides with the rotational axis of the variable motion-resistance component.

3. The input device as claimed in claim 2, wherein the integrated haptic unit is mounted to the housing with a second end of the cylindrical body of the variable motion-resistance component and the bridging structure being respectively supported in a manner so as to suspend the scroll wheel from the portion of the housing.

4. The input device as claimed in claim 3, wherein the second end of the cylindrical body of the variable motion-resistance component comprises an axle stud extending longitudinally, the axle stud being rotatably mounted to the housing so as to rotatably support the second end of the cylindrical body from the portion of the housing.

5. The input device as claimed in claim 3, further comprising a bracket, wherein the integrated haptic unit is coupled to the bracket for mounting to the housing, and wherein the bracket comprises a first socket to receive the second end of the cylindrical body of the variable motion-resistance component and a second socket to receive the bridging structure.

6. The input device as claimed in claim 5, wherein each of the first socket and the second socket comprises a snap-fit socket, a snap-on socket, a clip-on socket, a socket clip, or a socket clamp.

7. The input device as claimed in claim 5, wherein each of the first socket and the second socket comprises a pair of opposing cantilever arms extending from a seat portion in a manner so as to form a U-shaped arrangement, and wherein each of the pair of opposing cantilever arms has a hook-like element at a tip, the hook-like elements of the pair of opposing cantilever arms being directed towards each other.

8. The input device as claimed in claim 7, wherein the bracket is of an elongated shape, wherein the pair of sockets is on opposite longitudinal sides of the bracket.

9. The input device as claimed in claim 8,
wherein the bracket has a first protrusion extending longitudinally outwards along a longitudinal axis of the bracket from a first longitudinal end of the bracket and a second protrusion extending longitudinally outwards along the longitudinal axis of the bracket from a second longitudinal end of the bracket,
wherein the housing comprises a pair of opposing holder structures extending upright from the portion of the housing, wherein each of the pair of opposing holder structures has a hole, the holes of the pair of opposing holder structures being directed towards each other,
wherein the bracket is mounted to the pair of opposing holder structures with the first protrusion and the second protrusion of the bracket respectively inserted into the holes of the pair of opposing holder structures in a manner such that the bracket is pivotable about the longitudinal axis of the bracket with respect to the housing.

10. The input device as claimed in claim 9,
wherein the hole of a first bracket holder structure of the pair of opposing bracket holder structures receiving the first protrusion of the bracket is larger in a vertical dimension than that of the first protrusion of the bracket such that the first longitudinal end of the bracket is movable vertically relative to the first bracket holder structure so as to be pivotable about the second protrusion of the bracket, wherein an underneath surface of the bracket towards the first longitudinal end of the bracket is abutting a click switch disposed between the bracket and the portion of the housing.

11. The input device as claimed in claim 5, further comprising a lighting unit having at least one light source, the lighting unit being coupled to the bracket for illuminating the scroll wheel.

12. The input device as claimed in claim 3, further comprising a bracket of an elongated shape,
wherein the integrated haptic unit is coupled to the bracket for mounting to the housing,
wherein the bracket include a first socket to receive the second end of the cylindrical body of the variable motion-resistance component and a second socket to receive the bridging structure,
wherein the pair of sockets are on opposite longitudinal sides of the bracket,
wherein the bracket has a first protrusion extending longitudinally outwards along a longitudinal axis of the bracket from a first longitudinal end of the bracket and a second protrusion extending longitudinally outwards along the longitudinal axis of the bracket from a second longitudinal end of the bracket.

13. The input device as claimed in claim 12,
wherein the housing comprises a pair of opposing holder structures extending upright from the portion of the housing,
wherein each of the pair of opposing holder structures has a hole, the holes of the pair of opposing holder structures being directed towards each other,
wherein the bracket is mounted to the pair of opposing holder structures with the first protrusion and the second protrusion of the bracket respectively inserted into the holes of the pair of opposing holder structures in a manner such that the bracket is pivotable about the longitudinal axis of the bracket with respect to the housing,
wherein the bracket comprises a first plate-like appendage and a second plate-like appendage respectively extending laterally from the second longitudinal end of the bracket in a symmetrical manner with respect to the longitudinal axis of the bracket, each of the first plate-like appendage and the second plate-like appendage having a protrusion extending downwards from an underneath surface thereof,
wherein the protrusions of the first plate-like appendage and the second plate-like appendage are respectively abutting a first tilt switch and a second tilt switch disposed between the bracket and the portion of the housing.

14. The input device as claimed in claim 13,
wherein the hole of a first bracket holder structure of the pair of opposing bracket holder structures receiving the first protrusion of the bracket is larger in a vertical dimension than that of the first protrusion of the bracket such that the first longitudinal end of the bracket is movable vertically relative to the first bracket holder structure so as to be pivotable about the second protrusion of the bracket,
wherein an underneath surface of the bracket towards the first longitudinal end of the bracket is abutting a click switch disposed between the bracket and the portion of the housing.

15. An input device comprising
a housing;
a ring-shaped scroll wheel; and
a haptic unit inserted through the scroll wheel, the haptic unit comprising
a bridging structure,
a fluid based variable motion-resistance component coupled to the bridging structure, the fluid based variable motion-resistance component having a cylindrical body with a first end directed towards the bridging structure, the cylindrical body being rotatable relative to the bridging structure about a longitudinal axis of the cylindrical body, wherein the scroll wheel is fixedly attached to the cylindrical body in a coaxial manner, the fluid based variable motion-resistance component varies a motion-resistance profile against a relative rotation motion between the cylindrical body and the bridging structure based on an input control signal received by the haptic unit for defining a haptic behavior of the scroll wheel,
wherein the haptic unit is mounted to the housing in a manner so as to suspend the haptic unit and the scroll wheel from a portion of the housing.

16. The input device as claimed in claim 15, wherein the fluid based variable motion-resistance component is configured to vary a magnetic field applied across a fluid inside the cylindrical body based on the input control signal to vary a flow behavior of the fluid so as to vary the motion-resistance profile against the relative rotation motion between the cylindrical body and the bridging structure for defining the haptic behavior of the scroll wheel.

17. The input device as claimed in claim 15, wherein the fluid based variable motion-resistance component is based on magnetorheological fluid or electrorheological fluid.

* * * * *